United States Patent
Oh et al.

(10) Patent No.: US 12,479,889 B2
(45) Date of Patent: Nov. 25, 2025

(54) PROTEIN THAT SIMULTANEOUSLY AND POTENTLY BINDS TO BOTH MCL-1 AND BCL-xL AND USES THEREOF

(71) Applicant: KOREA ADVANCED INSTITUTE OF SCIENCE AND TECHNOLOGY, Daejeon (KR)

(72) Inventors: Byung-Ha Oh, Daejeon (KR); Seonghoon Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 17/924,014

(22) PCT Filed: Oct. 11, 2022

(86) PCT No.: PCT/KR2022/015234
§ 371 (c)(1),
(2) Date: Nov. 8, 2022

(87) PCT Pub. No.: WO2023/195588
PCT Pub. Date: Oct. 12, 2023

(65) Prior Publication Data
US 2024/0279284 A1    Aug. 22, 2024

(30) Foreign Application Priority Data

Apr. 6, 2022   (KR) .................. 10-2022-0043052
Aug. 11, 2022  (KR) .................. 10-2022-0100950

(51) Int. Cl.
C07K 14/00    (2006.01)
A61K 38/00    (2006.01)
A61P 35/02    (2006.01)

(52) U.S. Cl.
CPC ............ *C07K 14/001* (2013.01); *A61P 35/02* (2018.01); *A61K 38/00* (2013.01); *C07K 2319/00* (2013.01)

(58) Field of Classification Search
None
See application file for complete search history.

(56) References Cited

U.S. PATENT DOCUMENTS 9,750,814 B2    9/2017    Procko et al.
2020/0299285 A1  9/2020   Fletcher et al.

OTHER PUBLICATIONS

Kim, Seonghoon et al., 'Computational design of an apoptogenic protein that binds BCL-xL and MCL-1 simultaneously and potently', Computational and Structural Biotechnology Journal, Jun. 14, 2022(online publication date), vol. 20, pp. 3019-3029.
Abdul Rahman, Siti Fairus Abdul et al., 'Co-inhibition of BCL-xL and MCL-1 with selective BCL-2 family inhibitors enhances cytotoxicity of cervical cancer cell lines' Biochemistry and Biophysics Reports, Apr. 22, 2022 (online publication date), vol. 22, article No. 100756, pp. 1-8.
Lee, Erinna F. et al., 'BCL-xL and MCL-1 are the key BCL-2 family proteins in melanoma cell survival', Cell Death & Disease, Apr. 24, 2019 (online publication date), vol. 10, article No. 342, pp. 1-14.
Abdul Rahman, Siti Fairus et al., 'Dual inhibition of anti-apoptotic proteins BCL-xL and MCL-1 enhances cytotoxicity of nasopharyngeal carcinoma cells', Discover Oncology, Feb. 3, 2022 (online publication date), vol. 13, article No. 9, pp. 1-12.
International Search Report from corresponding PCT Application No. PCT/KR2022/015234, dated Jan. 25, 2023.
Uhlman Peyman, Chemical Reviews, 90:543-584(1990).
Smith and Waterman, Adv. Appl. Math. 2:482(1981).
Needleman and Wunsch, J. Mol. Bio. 48:443(1970).
Pearson and Lipman, Methods in Mol. Biol. 24: 307-31(1988).
Higgins and Sharp, Gene 73:237-44(1988).
Higgins and Sharp, CABIOS 5:151-3(1989).
Corpet et al., Nuc. Acids Res. 16:10881-90(1988).
Huang et al., Comp. Appl. BioSci. 8:155-65(1992).
Pearson et al., Meth. Mol. Biol. 24:307-31 (1994).
Altschul et al., J. Mol. Biol. 215:403-10(1990).
Yanofsky, C., J. Bacteriol., 158:1018-1024(1984).
Herskowitz, I. and Hagen, D., Ann. Rev. Genet., 14:399-445(1980).
Cohen, S.N. et al., Proc. Natl. Acac. Sci. USA, 9:2110-2114(1973).
Hanahan, D., J. Mol. Biol., 166:557-580(1983).
Dower, W.J. et al., Nucleic. Acids Res., 16:6127-6145(1988).
Capecchi, M.R., Cell, 22:479(1980).
Graham, F.L. et al., Virology, 52:456(1973).
Neumann, E. et al., EMBO J., 1:841(1982).
Wong. T.K. et al., Gene, 10:87(1980).
Gopal, Mol. Cell Biol., 5:1188-1190(1985).
Yang et al., Proc. Natl. Acad. Sci., 87:9568-9572(1990).
Kim, Seonghoon, et al.; "Computational design of an apoptogenic protein that binds BCL-xL and MCL-1 simultaneously and potently", Computational and Structural Biotechnology Journal 20 (2022) 3019-3029.

*Primary Examiner* — Ruixiang Li
(74) *Attorney, Agent, or Firm* — Harness, Dickey & Pierce, P.L.C.

(57) ABSTRACT

The present invention relates to a protein that simultaneously binds to both MCL-1 and BCL-xL and uses thereof. The protein of the present invention simultaneously and specifically binds to both MCL-1 and BCL-xL, which are anti-apoptotic BCL-2 family proteins whose expression is increased in various carcinomas, and thus can be usefully applied to the prevention or treatment of cancers.

4 Claims, 18 Drawing Sheets

Specification includes a Sequence Listing.

SEQUENCE LISTING

```
Sequence total quantity: 10
SEQ ID NO: 1            moltype = AA  length = 116
FEATURE                 Location/Qualifiers
source                  1..116
                        mol_type = protein
                        organism = synthetic construct
SEQUENCE: 1
ADPKKVLDKA KDQAENRVRE LKQVLEELYK EARKLDLTQE MRKKLIERYA AAIIRAIGDI   60
NNAIYQAKQE AEKLKKAGLV NSQQLDELLR RLDELQKEAS RKANEYGREF ELKLEY      116

SEQ ID NO: 2            moltype = AA  length = 164
FEATURE                 Location/Qualifiers
source                  1..164
                        mol_type = protein
                        organism = synthetic construct
```

```
SEQUENCE: 2
MDAKKVAKKA ADQAANRIRE LAQVLVELLK EALKLDLTQE MRKKLIERYA AAIIRAIGDI    60
NNAIYQAKQE AEKLKKAGLV DSDQLDALLR ALDELQKEAS RAANELGRLF EEALKRLDKD   120
NGGEEEKDRT AKWFETEAKR IADEFDKRAK ELVRKLEEEW RRLK                   164

SEQ ID NO: 3           moltype = AA   length = 164
FEATURE                Location/Qualifiers
source                 1..164
                       mol_type = protein
                       organism = synthetic construct
SEQUENCE: 3
MDAKKVAKKA ADQAANRIRE LAQVLVELLK EALKLDLTQE MRKKLIERYA AAIIRAIGDI    60
NNAIYQAKQE AEKLKKAGLV DSDQLDALLR ALDELQKVAS KAANQLGRLF EEALKRLDKD   120
NGGEEEKDRT AKWFEFEARA IAIALTLAAI GDVFDLEKEW RKLK                   164

SEQ ID NO: 4           moltype = AA   length = 164
FEATURE                Location/Qualifiers
source                 1..164
                       mol_type = protein
                       organism = synthetic construct
SEQUENCE: 4
MDAKKVAKKA AIQAARRITE LAQVLVELLK EALKLDLTQE MRKKLIERYA AAIIRAIGDI    60
NNAIYQAKQE AEKLKKAGLV DSDQLDALLR ALDELQKVAS KAANQLGRLF EEALKRLDKD   120
NGGEEEKDRT AKWFEFEARA IEIALRLAAI GDVFDLEKEW RKLK                   164

SEQ ID NO: 5           moltype = AA   length = 164
FEATURE                Location/Qualifiers
source                 1..164
                       mol_type = protein
                       organism = synthetic construct
SEQUENCE: 5
MDAKKVAKKA AIQAARRITE LAQVLVELLK EALKLDLTQE MRKKLIERYA AAIIRAIGDI    60
NNAIYQAKQE AEKLKKAGLV DSDQLDALLR ALDELQKVAS KAANQLGRLF EEALKRLDKD   120
NGGEEEKDRT AKWFEFEARA IELALRLAAI GDVFDLEKEW RKLK                   164

SEQ ID NO: 6           moltype = DNA   length = 492
FEATURE                Location/Qualifiers
source                 1..492
                       mol_type = other DNA
                       organism = synthetic construct
SEQUENCE: 6
atggatgcaa agaaggtggc taaaaaagct gctatccagg ctgcccgccg cattaccgag    60
cttgcgcaag tgcttgtaga attgttgaaa gaggctttga agctggattt aacgcaggag   120
atgcgtaaaa aattgatcga acgctatgca gcagctatta ccgcgcaat cggagacatc   180
aacaatgcca tctatcaagc caaacaagaa gctgagaagt taaaaaaggc gggttttggtt   240
gacagcgacc agttggacgc attgttacgt gcacttgatg aattgcaaaa ggtggcttcc   300
aaagcagcca atcaacttgg ccgttttgttc gaagaagtgc tgaaacgtct tgataaagac   360
aacggagggg aagaggaaaa ggatcgtact gccaagtggt tcgaatttga ggctcgcgct   420
atcgagctgg ctctgcgctt ggcagccatc ggggatgtat ttgacttgga gaaagaatgg   480
cgcaagttaa ag                                                      492

SEQ ID NO: 7           moltype = AA   length = 233
FEATURE                Location/Qualifiers
source                 1..233
                       mol_type = protein
                       organism = synthetic construct
SEQUENCE: 7
MSQSNRELVV DFLSYKLSQK GYSWSQFSDV EENRTEAPEG TESEMETPSA INGNPSWHLA    60
DSPAVNGATG HSSSLDAREV IPMAAVKQAL REAGDEFELR YRRAFSDLTS QLHITPGTAY   120
QSFEQVVNEL FRDGVNWGRI VAFFSFGGAL CVESVDKEMQ VLVSRIAAWM ATYLNDHLEP   180
WIQENGGWDT FVELYGNNAA AESRKGQERF NRWFLTGMTV AGVVLLGSLF SRK           233

SEQ ID NO: 8           moltype = AA   length = 350
FEATURE                Location/Qualifiers
source                 1..350
                       mol_type = protein
                       organism = synthetic construct
SEQUENCE: 8
MFGLKRNAVI GLNLYCGGAG LGAGSGGATR PGGRLLATEK EASARREIGG GEAGAVIGGS    60
AGASPPSTLT PDSRRVARPP PIGAEVPDVT ATPARLLFFA PTRRAAPLEE MEAPAADAIM   120
SPEEELDGYE PEPLGKRPAV LPLLELVGES GNNTSTDGSL PSTPPPAEEE EDELYRQSLE   180
IISRYLREQA TGAKDTKPMG RSGATSRKAL ETLRRVGDGV QRNHETAFQG MLRKLDIKNE   240
DDVKSLSRVM IHVFSDGVTN WGRIVTLISF GAFVAKHLKT INQESCIEPL AESITDVLVR   300
TKRDWLVKQR GWDGFVEFFH VEDLEGGIRN VLLAFAGVAG VGAGLAYLIR              350

SEQ ID NO: 9           moltype = AA   length = 26
FEATURE                Location/Qualifiers
source                 1..26
                       mol_type = protein
```

-continued

```
                         organism = synthetic construct
SEQUENCE: 9
DMRPEIWIAQ ELRRIGDEFN AYYARR                                      26

SEQ ID NO: 10            moltype = AA  length = 20
FEATURE                  Location/Qualifiers
source                   1..20
                         mol_type = protein
                         organism = synthetic construct
SEQUENCE: 10
PRMVILRLLR YIVRLVWRMH                                             20
```

PROTEIN THAT SIMULTANEOUSLY AND POTENTLY BINDS TO BOTH MCL-1 AND BCL-xL AND USES THEREOF

This application is a national phase application of PCT/KR2022/015234 filed on Oct. 11, 2022, which claims priority to Korean Patent Application Nos. 10-2022-0043052, filed on Apr. 6, 2022 and 10-2022-0100950, filed on Aug. 11, 2022. The entire disclosures of the applications identified in this paragraph are incorporated herein by references.

TECHNICAL FIELD

The present invention has been made with the support of the Ministry of Science and ICT of the Republic of Korea, under Project Number 2020R1A4A3079755, wherein the research management institution for the above project is the National Research Foundation of Korea, the research project name is "Group Research Support (R&D)", the research task name is "Study of molecular correlation between conformational change of cell nucleus and cellular senescene", the responsible institution is the Korea Advanced Institute of Science and Technology, and the research period is 2021.06.01-2022.02.28.

The present invention relates to a protein that simultaneously binds to both MCL-1 and BCL-xL and uses thereof.

BACKGROUND

Apoptosis (programmed-cell death) is an evolutionarily conserved pathway that is essential for tissue homeostasis, development and elimination of damaged cells. Deregulation of apoptosis leads to human diseases including malignancies, neurodegenerative disorders, immune system diseases and autoimmune diseases.

The B-cell lymphoma 2 (BCL-2) family proteins regulate the mitochondrial-mediated apoptosis pathway, and ultimately releases an apoptogenic protein such as cytochrome C and Smac/DIABLO(Second mitochondria-derived activator of caspase/Direct inhibitor of apoptosis-binding protein with low pI) from mitochondria to the cytoplasm through mitochondrial outer membrane permeabilization (MOMP). The BCL-2 family proteins include pro-apoptotic proteins and anti-apoptotic proteins, and progression of apoptosis depends on the degree of pairing of pro-apoptotic BCL-2 proteins and anti-apoptotic BCL-2 proteins.

One of the hallmarks of cancer cells is their ability to evade apoptosis, which confers survival advantages or cells and causes resistance to anti-cancer drugs. Since cancer cells resist apoptosis by upregulating anti-apoptotic BCL-2 proteins, the inhibition of BCL-2 proteins may be an effective cancer treatment. The inhibition of a single anti-apoptotic BCL-2 family protein member has mostly proven ineffective, and it is known that the simultaneous targeting of two anti-apoptotic BCL-2 family members produces a synergistic effect, thus enhancing apoptosis.

Meanwhile, BH3-mimicking small molecules that inhibit anti-apoptotic BCL-2 family proteins are currently under clinical investigation for use in diverse malignancies as single agents or as components of combination therapies. Some of these have already shown promise in the treatment of solid tumors and hematological malignancies at the clinical or preclinical stage. However, since these BH3 mimics cannot discriminate between normal cells and cancer cells, and suppress BCL-2 family proteins not only in cancer cells but also in normal cells, whose side effects are of primary concern. When multiple BH3 mimetics were used to inhibit multiple BCL-2 family proteins, it would increase the risk of side effects.

Therefore, there is a need to develop a molecule that can simultaneously bind to two or more anti-apoptotic BCL-2 family proteins, induce apoptosis in cancer cells, and thereby treat cancer without the risk of side effects.

Numerous papers and patent literatures are referenced throughout the present specification and citations thereof are indicated. The disclosures of the cited papers and patent literatures are incorporated herein by reference in their entirety, so as to more clearly describe the level of the technology to which the present invention pertains and the contents of the present invention.

DETAILED DESCRIPTION

Technical Problem

The present inventors have made intensive researches to develop a molecule that can simultaneously bind to two or more anti-apoptotic BCL-2 family proteins and induce apoptosis in cancer cells. As a result, the inventors have developed a protein that simultaneously binds to both MCL-1 and BCL-xL, and found that the apoptogenic activity of this protein is excellent, thereby completing the present invention.

Therefore, it is an object of the present invention to provide a protein comprising any one amino acid sequence selected from the group consisting of the amino acid sequence of SEQ ID NO: 3, the amino acid sequence of SEQ ID NO: 4, and the amino acid sequence of SEQ ID NO: 5.

It is another object of the present invention to provide a nucleic acid molecule comprising a nucleotide sequence encoding said protein, a recombinant vector comprising the nucleic acid molecule, and an isolated host cell comprising the same.

It is another object of the present invention to provide a pharmaceutical composition for preventing or treating cancer comprising the protein.

It is yet another object of the present invention to provide a method of treating cancer comprising administering the pharmaceutical composition to a subject in need thereof.

Still other objects and advantages of the present invention will become more apparent from the following detailed description of the invention, claims and drawings.

Technical Solution

According to one embodiment of the present invention, there is provided a protein comprising any one amino acid sequence selected from the group consisting of the amino acid sequence of SEQ ID NO: 3, the amino acid sequence of SEQ ID NO: 4, and the amino acid sequence of SEQ ID NO: 5.

The present inventors have made intensive research to develop a molecules that can simultaneously binding to two or more anti-apoptotic BCL-2 family proteins to induce apoptosis in cancer cells. As a result, the inventors have developed a proteins that simultaneously and specifically bind to both MCL-1 and BCL-xL and confirmed that this protein has excellent apoptogenic activity.

BCL-2 family proteins have at least one BCL-2 homology (BH) domain, and are classified into the following three groups that are distinguished by their function and their number of BH domains: (i) pro-apoptotic and pore-forming proteins (BAX, BAK and BOK) which contain BH1 through BH3, (ii) pro-apoptotic BH3-only proteins (BIM, BID, BAD, PUMA, NOXA and BNIP3, etc.), and (iii) anti-apoptotic proteins having three or more BH domains (such as BCL-2, BCL-B, BCL-W, BCL-xL, BFL-1(A1) and MCL-1). BH3-only proteins induce apoptosis by directly binding to BAX and BAK and activating them, or induces apoptosis by interfering with the function of the anti-apoptotic BCL-2 protein.

Because many cancer cells upregulate anti-apoptotic BCL-2 family proteins to resist apoptosis, inhibiting the anti-apoptotic BCL-2 family protein may be an effective cancer treatment method. However, the inhibition of only a single anti-apoptotic BCL-2 family protein member has been proven mostly ineffective, and it is known that the simultaneous targeting of two anti-apoptotic BCL-2 family proteins produces a synergistic effect, thus enhancing apoptosis.

As used herein, the term "amino acid" refers to the most basic structural unit of protein molecules. Looking at the structure of an amino acid, an amino group (—$NH_2$) and a carboxyl group (—COOH) are attached to one carbon atom, to which a hydrogen and R group are connected.

As used herein, the term "protein" is used interchangeably with "polypeptide", and refers to a polymer of amino acids that are covalently linked by peptide bonds. Proteins must contain at least two amino acids. Polymers of such amino acid residues may contain natural or non-natural amino acid residues, and includes peptides, oligopeptides, dimers, trimers and multimers of amino acid residues, full-length proteins and fragments thereof, but are not limited thereto. As used herein, the "protein" includes natural or artificial proteins, protein fragments and protein analogs. The protein of the present invention can be produced according to synthetic methods known in the art, and for example, an expression vector containing a protein-expressing nucleic acid molecule is transformed into a host cell to synthesize a recombinant protein, or it can be prepared according to solid-phase synthesis techniques (Merrifield, J. Amer. Chem. Soc. 85:2149-54(1963); Stewart, et al., Solid Phase Peptide Synthesis, 2nd. ed., Pierce Chem. Co.: Rockford, 111(1984)).

As used herein, the term "specifically binds" or the like has the same meaning as commonly understood by one of ordinary skill in the art, and means that it is associated with the interaction of a protein or peptide with a second chemical species, and the interaction changes depending on the presence of the specific structure of the chemical species. That is, the protein or peptide recognizes and binds to a specific structure of the second chemical species to form a relatively stable complex under physiological conditions. Specific binding can be characterized by an equilibrium dissociation constant (e.g., a $K_D$ lower than this indicates a tighter bond) of at least about $1\times10^{-6}$ M or less (e.g., $9\times10^{-7}$ M, $8\times10^{-7}$ M, $7\times10^{-7}$ M, $6\times10^{-7}$ M, $5\times10^{-7}$ M, $4\times10^{-7}$ M, $3\times10^{-7}$ M, $2\times10^{-7}$ M, or $1\times10^{-7}$ M), preferably $1\times10^{-7}$ M or less (e.g., $9\times10^{-8}$ M, $8\times10^{-8}$ M, $7\times10^{-8}$ M, $6\times10^{-8}$ M, $5\times10^{-8}$ M, $4\times10^{-8}$ M, $3\times10^{-8}$ M, $2\times10^{-8}$ M, or $1\times10^{-8}$ M), more preferably $1\times10^{-8}$ M or less (e.g., $9\times10^{-9}$ M, $8\times10^{-9}$ M, $7\times10^{-9}$ M, $6\times10^{-9}$ M, $5\times10^{-9}$ M, $4\times10^{-9}$ M, $3\times10^{-9}$ M, $2\times10^{-9}$ M, or $1\times10^{-9}$ M). Methods for determining whether two molecules specifically bind are well known in the art and include, for example, equilibrium dialysis, surface plasmon resonance, and the like.

As used herein, the term "affinity" refers to the strength of the sum of non-covalent interactions between a single binding site of a molecule and its binding partner. Unless otherwise specified, the term "binding affinity" as used herein refers to intrinsic binding affinity that reflects a 1:1 interaction between members of a binding pair. Affinity can generally be expressed as the dissociation constant ($K_D$). Affinity can be measured by conventional methods known in the art, including those described herein.

In one embodiment of the present invention, the protein of the present invention can bind to an anti-apoptotic BCL-2 family protein (BCL-2 family protein).

In one embodiment of the present invention, the anti-apoptotic BCL-2 family protein may be any one protein selected from the group consisting of MCL-1, BCL-xL BCL-2 (B-cell lymphoma 2), BCL-B, BCL-W, BCL-xL (B-cell lymphoma-extra large) and BFL-1 (A1), but is not limited thereto.

In one embodiment of the present invention, the protein of the present invention can simultaneously bind to MCL-1 (myeloid cell leukemia 1); and any one anti-apoptotic BCL-2 family protein selected from the group consisting of B-cell lymphoma 2 (BCL-2), BCL-B, BCL-W, B-cell lymphoma-extra large (BCL-xL) and BFL-1 (A1), but is not limited thereto.

In one embodiment of the present invention, the anti-apoptotic BCL-2 family protein may be BCL-xL, but is not limited thereto.

The present inventors have designed a protein that simultaneously binds to both MCL-1 and BCL-xL by adding a fourth helix to αMCL1, which is an existing protein that specifically binds to MCL-1 ($K_D$ of 150 pM) and has a 3-helix bundle structure. A binding site for BCL-xL exists in the fourth helix of αMCL1. The BCL-xL/MCL-1 binding protein first designed in the embodiments of the present specification was named "4H_αBM_1" (SEQ ID NO: 3). After conformational verification of 4H_αBM_1, "4H_αBM_2" (SEQ ID NO: 4), having a 40-fold stronger affinity for BCL-xL than 4H_αBM_1, was further designed by substituting Ile for the 12th amino acid residue Asp, Arg for the 16th amino acid residue Asn, Thr for the 19th amino acid residue Arg, Glu for amino acid residue Ala at position 142, and Arg for the 146th amino acid residue Thr. After that, in order to improve the binding specificity of the BCL-xL binding site, "4H_αBM_3" (SEQ ID NO: 5) in which the 143rd amino acid residue Ile was substituted with Leu was finally designed, and the BCL-xL binding site of "4H_αBM_3" binds to BCL-xL with a $K_D$ of 820 pM, and the MCL-1 binding site binds to MCL-1 with a $K_D$ of 196 pM, indicating high affinity. Further, the BCL-xL binding site of "4H_αBM_3" also showed significant affinity for BCL-2 ($K_D$ of 2.04 nM) and BCL-W ($K_D$ of 1.59 nM), which are other anti-apoptotic BCL-2 family proteins. The anti-apoptotic BCL-2 family proteins BCL-B and BFL-1 showed a $K_D$ of 146 nM and a $K_D$ of 16.4 nM, respectively. In an embodiment of the present invention, the "4H_αBM_3" was confirmed to have excellent apoptogenic activity.

In one embodiment of the present invention, the above-mentioned protein that simultaneously binds to MCL-1 and BCL-xL forms a specific binding with BCL-xL at the 12th, 15th, 16th, 94th, 97th, 105th, 136th, 137th, 139th, 140th, 143rd, 144th, 146th to 148th, 150th to 152th, 154th, 155th, 157th, 158th, 161th and 162th amino acid residues of the amino acid sequence of SEQ ID NO: 5, and forms a specific binding with MCL-1 at the 43rd, 46th, 47th, 49th, 50th, 51st, 53rd to 55th, 57th to 59th, 62nd, 65th, 66th, 100th, 104th, 108th, 111th and 114th amino acid residues of the amino acid sequence of SEQ ID NO: 5.

In one embodiment of the present invention, the above-mentioned protein that simultaneously binds to MCL-1 and BCL-xL specifically binds to the BH3-binding groove present in the cytoplasmic domain of each of MCL-1 and BCL-xL. MCL-1 and BCL-xL are composed of one cytoplasmic domain excluding the transmembrane domain. The cytoplasmic domain of BCL-xL is a portion from the first amino acid residue to the 209th amino acid residue in the amino acid sequence of BCL-xL of SEQ ID NO: 7, and the cytoplasmic domain of MCL-1 is a portion from the 171st amino acid residue to the 327th amino acid residue in the MCL-1 amino acid sequence of SEQ ID NO:8.

In one embodiment of the present invention, the protein that simultaneously binds to MCL-1 and BCL-xL forms a specific binding with BCL-xL at the 93rd, 96th, 97th, 100th, 101th, 104th, 105th, 108th, 111th to 113th, 118th, 121st, 125th, 126th, 129th, 130th, 133th, 136th, 138th, 139th, 141th, 142nd, 146th, and 193rd to 195th amino acid residues in the amino acid sequence of BCL-xL of SEQ ID NO: 7, and forms a specific binding with MCL-L at the 216th, 220th, 223th, 224th, 226th to 228th, 231th, 233th to 235th, 245th, 248th, 249th, 252th, 253th, 256th, 260th to 263th, 266th, 267th, 270th, 318th, 319th amino acid residues in the amino acid sequence of MCL-1 of SEQ ID NO: 8.

The protein of the present invention may include a variant of the amino acid sequence within the range capable of specifically recognizing MCL-1 or the aforementioned anti-apoptotic BCL-2 family protein, as recognized by those skilled in the art. For example, variation can be added to the amino acid sequence of the protein to improve the binding affinity and/or other biological properties of the protein of the present invention. Such modifications include, for example, deletions, insertions and/or substitutions of amino acid sequence residues of the protein.

The variant has "substantial similarity", which means that the two peptide sequences, when optimally aligned, such as by the program GAP or BESTFIT using default gap weights, share at least about 90% sequence identity, more preferably at least about 95%, 98% or 99% sequence identity. Preferably, residue positions that are not identical differ by conservative amino acid substitutions. A "conservative amino acid substitution" is one in which an amino acid residue is substituted by another amino acid residue having a side chain (R group) with similar chemical properties (e.g., charge or hydrophobicity). Generally, the conservative amino acid substitutions do not substantially change the functionality of the protein.

Such amino acid mutations are performed based on the relative similarity of amino acid side chain substituents, such as hydrophobicity, hydrophilicity, charge, size, and the like. By the analysis of the size, shape and type of amino acid side chain substituents, it can be seen that arginine, lysine and histidine are all positively charged residues; alanine, glycine and serine have similar sizes; and phenylalanine, tryptophan and tyrosine have similar shapes. Therefore, based on these considerations, arginine, lysine and histidine; alanine, glycine and serine; and phenylalanine, tryptophan and tyrosine can be said to be biologically functional equivalents.

When introducing the mutations, the hydropathic index of the amino acid may be considered. Each amino acid is assigned a hydropathic index according to its hydrophobicity and charge: isoleucine (+4.5); valine (+4.2); leucine (+3.8); phenylalanine (+2.8); cysteine/cysteine (+2.5); methionine (+1.9); alanine (+1.8); glycine (−0.4); threonine (−0.7); serine (−0.8); tryptophan (−0.9); tyrosine (−1.3); proline (−1.6); histidine (−3.2); glutamate (−3.5); glutamine (−3.5); aspartate (−3.5); asparagine (−3.5); lysine (−3.9); and arginine (−4.5).

The hydropathic amino acid index is very important in imparting an interactive biological function of a protein. It is a known fact that similar biological activity can be retained by substituting with amino acids having a similar hydropathic index. When introducing a mutation with reference to the hydropathic index, the substitution is performed between amino acids showing a difference in the hydropathic index, preferably within ±2, more preferably within ±1, and even more preferably within ±0.5.

Meanwhile, it is also well known that substitution between amino acids having similar hydrophilicity values results in proteins having equivalent biological activity. As disclosed in U.S. Pat. No. 4,554,101, the following hydrophilicity values are assigned to each amino acid residue: arginine (+3.0); lysine (+3.0); asphaltate (+3.0±1); glutamate (+3.0±1); serine (+0.3); asparagine (+0.2); glutamine (+0.2); glycine (0); threonine (−0.4); proline (−0.5±1); alanine (−0.5); histidine (−0.5); cysteine (−1.0); methionine (−1.3); valine (−1.5); leucine (−1.8); isoleucine (−1.8); tyrosine (−2.3); phenylalanine (−2.5); tryptophan (−3.4).

When the mutation is introduced with reference to the hydrophilicity value, the substitution is performed between amino acids exhibiting a difference in the hydrophilicity value within preferably ±2, more preferably within ±1, and even more preferably within ±0.5. Amino acid exchanges in proteins that do not generally alter the activity of the molecule are known in the state of the art (H. Neurath, R. L. Hill, The Proteins, Academic Press, New York, 1979). The most commonly occurring exchanges are those between amino acid residues Ala/Ser, Val/Ile, Asp/Glu, Thr/Ser, Ala/Gly, Ala/Thr, Ser/Asn, Ala/Val, Ser/Gly, Thy/Phe, Ala/Pro, Lys/Arg, Asp/Asn, Leu/Ile, Leu/Val, Ala/Glu, Asp/Gly.

In one embodiment of the present invention, the protein of the present invention includes a protein containing minor changes to the above-mentioned amino acid sequences, that is, modifications that have little effect on the tertiary structure and function of the protein. Therefore, in some embodiments, even if they are not identical to the above-mentioned sequences, they can have at least 100%, 93%, 95%, 96%, 97%, or 98% or more similarity.

In one embodiment of the present invention, the polypeptide containing an amino acid sequence that increases apoptogenic activity may be fused to a protein comprising any one amino acid sequence that is selected from the group consisting of the amino acid sequence of SEQ ID NO: 3, the amino acid sequence of SEQ ID NO: 4, and the amino acid sequence of SEQ ID NO: 5 according to the present invention. More specifically, it can be fused and linked to the N-terminus or C-terminus, and most specifically to the C-terminus, but is not limited thereto.

In one embodiment of the present invention, the polypeptide containing an amino acid sequence that increases apoptogenic activity may include the amino acid sequence of SEQ ID NO: 9 or the amino acid sequence of SEQ ID NO: 10, but is not limited thereto. In one embodiment of the present invention, when the BIM BH3 sequence (SEQ ID NO: 9) or the C-terminal sequence (CTS) of BIM (SEQ ID NO: 10) is fused to 4H_αBM_3, it could be confirmed that the apoptogenic activity is increased. The BIM BH3 directly activates BAX/BAK, and the CTS of the BIM is a mitochondrial targeting sequence, and promote the movement of the BIM to the mitochondrial outer membrane, which is the site of action of the anti-apoptotic BCL-2 protein, to promote apoptosis, whereby when fused to the above-mentioned protein of the present invention, its induced activity can be increased.

According to another aspect of the present invention, there is provided a nucleic acid molecule comprising a nucleotide sequence encoding a protein of the present invention.

As used herein, the term "nucleic acid" is meant to include DNA (gDNA and cDNA) and RNA molecules inclusively, and nucleotides, which are the basic building blocks of a nucleic acid molecule, includes not only naturally occurring nucleotides but also analogues modified at the sugar or base positions (Scheit, Nucleotide Analogs, John Wiley, New York (1980); Uhlman an d Peyman, Chemical Reviews, 90:543-584(1990)).

In one embodiment of the present invention, it is apparent to those skilled in the art that the nucleotide sequence encoding the protein of the present invention is sufficient if it is a nucleotide sequence encoding the protein of the present invention described above, and is not limited to any specific nucleotide sequence. Therefore, in a specific embodiment of the present invention, the nucleotide sequence encoding the protein of the present invention may be the nucleotide sequence of SEQ ID NO: 6, but is not limited thereto.

This is because even if a nucleotide sequence mutation occurs, expression of the mutated nucleotide sequence as a protein may result in no change in the protein sequence. This is called codon degeneracy. Therefore, the nucleotide sequence includes nucleotide sequences that contain functionally equivalent codons or codons encoding the same amino acids (e.g., due to codon degeneracy, arginine or serine has six codons), or codons encoding biologically equivalent amino acids.

Considering the mutation having the above-mentioned biological equivalent activity, nucleic acid molecules encoding the polypeptides or complexes of the present invention are construed as including sequences exhibiting substantial identity to the sequences set forth in the sequence listing. When the sequence of the present invention and any other sequences are aligned so as to correspond to each other as much as possible, and the aligned sequence is analyzed using an algorithm commonly used in the art, the substantial identity means sequences exhibiting at least 60% homology (e.g., 60%, 61%, 62%, 63%, 64%, 65%, 66%, 67%, 68%, or 69%), more preferably at least 70% homology (e.g., 70%, 71%, 72%, 73%, 74%, 75%, 76%, 77%, 78%, or 79%), even more preferably at least 80% homology (e.g., 80%, 81%, 82%, 83%, 84%, 85%, 86%, 87%, 88%, or 89%), most preferably at least 90% homology (e.g., 90%, 91%, 92%, 93%, 94%, 95%, 96%, 97%, 98%, 99%, or 100%). All integers of 70% or more and 100% or less and prime numbers therebetween are included within the scope of the present invention with respect to % homology.

Alignment methods for sequence comparison are known in the art. Various methods and algorithms for alignment are disclosed in Smith and Waterman, *Adv. Appl. Math.* 2:482 (1981); Needleman and Wunsch, *J. Mol. Bio.* 48:443(1970); Pearson and Lipman, *Methods in Mol. Biol.* 24: 307-31 (1988); Higgins and Sharp, *Gene* 73:237-44(1988); Higgins and Sharp, *CABIOS* 5:151-3(1989); Corpet et al., *Nuc. Acids Res.* 16:10881-90(1988); Huang et al., *Comp. Appl. BioSci.* 8:155-65(1992) and Pearson et al., *Meth. Mol. Biol.* 24:307-31(1994). NCBI Basic Local Alignment Search Tool (BLAST) (Altschul et al., *J. Mol. Biol.* 215:403-10(1990)) is accessible from NBCI (National Center for Biological Information), and is available in conjunction with sequencing programs such as blastp, blastn, blastx, tblastn and tblastx on the Internet. BLAST is accessible through the BLAST page of the ncbi website. Sequence homology comparison methods using this program can be found on the BLAST help page of the ncbi website.

According to another aspect of the present invention, there is provided a recombinant vector comprising the above-mentioned nucleic acid molecule.

According to another aspect of the present invention, there is provided an isolated host cell comprising the above-mentioned recombinant vector.

In one embodiment of the present invention, the vector is operatively linked to the nucleotide sequence encoding the protein of the present invention as described above.

As used herein, the term "operatively linked" refers to a functional linkage between a nucleic acid expression control sequence (e.g., promoter, signal sequence, or an array of transcriptional regulator binding sites) and another nucleic acid sequence, whereby the regulatory sequence regulates the transcription and/or translation of the other nucleic acid sequence.

The vector system of the present invention can be constructed through various methods known in the art, and specific methods thereof are disclosed in Sambrook, et al., Molecular Cloning, A Laboratory Manual, Cold Spring Harbor Laboratory Press (2001), which is incorporated herein by reference.

Vectors of the present invention can typically be constructed as vectors for cloning or as vectors for expression. In addition, the vector of the present invention can be constructed using a prokaryotic cell or a eukaryotic cell as a host.

For example, when the vector of the present invention is an expression vector and a prokaryotic cell is used as a host, it is common to include a strong promoter capable of propagating transcription (e.g., pLλ promoter, trp promoter, lac promoter, T7 promoter, tac promoter, etc.), a ribosome binding site for initiation of translation, and a transcription/translation termination sequence. When *E. coli* is used as a host cell, the promoter and operator sites of the *E. coli* tryptophan biosynthesis pathway (Yanofsky, C., J. Bacteriol., 158:1018-1024(1984)) and the left-handed promoter of phage λ (pLλ promoter, Herskowitz, I. and Hagen, D., Ann. Rev. Genet., 14:399-445 (1980)) can be used as regulatory sites.

Meanwhile, vectors that can be used in the present invention can be produced by engineering plasmid (e.g., pJK hTx, pCDFduet, pCW57.1, pSK349, pSC101, ColE1, pBR322, pUC8/9, pHC79, pGEX series, pET series and pUC19, etc.), phage (e.g., λgt·λ4B, λ-Charon, λΔz1, and M13, etc.) or virus (e.g., SV40, etc.), that are often used in the art.

The vector of the present invention can be fused with other sequences to facilitate purification of the protein expressed therefrom. The sequence to be fused includes, for example, glutathione S-transferase (Pharmacia, USA), maltose binding protein (NEB, USA), FLAG (IBI, USA) and 6× His (hexahistidine; Quiagen, USA)., and the like. Because of the additional sequences for purification, the protein expressed in the host is rapidly and easily purified via affinity chromatography.

The vector of the present invention may include an antibiotic resistance gene commonly used in the art as a selection marker, and examples thereof include resistance genes to ampicillin, gentamicin, carbenicillin, chloramphenicol, streptomycin, kanamycin, geneticin, neomycin and tetracycline.

Meanwhile, when the vector of the present invention is an expression vector and a eukaryotic cell is used as a host, promoters derived from the genome of mammalian cells (e.g., metallotionine promoter) or promoters derived from mammalian viruses (e.g., adenovirus late promoter, vaccinia virus 7.5K promoter, SV40 promoter, cytomegalovirus promoter and HSV tk promoter can be used, and generally have a polyadenylation sequence as a transcription termination sequence.

Optionally, the vector may further carry genes encoding reporter molecules (e.g., luciferase and -glucuronidase).

As a host cell capable of stably and continuously cloning and expressing the vector of the present invention, any host cell known in the art can be used, and examples thereof include *E. coli* strains such as *E. coli* Origami2, *E. coli* JM109, *E. coli* BL21(DE3), *E. coli* RR1, *E. coli* LE392, *E. coli* B, *E. coli* X 1776, *E. coli* W3110, *E. coli* Lemo(DE3), *Bacillus* genus strains such as *Bacillus subtilis, Bacillus thuringiensis*, and Enterobacteria and strains such as *Salmonella typhimurium, Serratia marcesens*, and various *Pseudomonas* species.

Further, when the vector of the present invention is transformed into a eukaryotic cell, yeast (*Saccharomyces cerevisiae*), insect cells, animal cells (e.g., CHO cell lines (Chinese hamster ovary), W138, BHK, COS-7, 293, HepG2, 3T3, RIN and MDCK cell lines), and the like can be used as the host cell.

In one embodiment of the present invention, the host cell transformed with the vector of the present invention is *E. coli*. In a more specific embodiment of the present invention, the host cell transformed with the vector of the present invention is *E. coli* Lemo (DE3), but is not limited thereto.

The method of delivering the vector of the present invention into a host cell can, when the host cell is a prokaryotic cell, be carried out by the CaCl2 method (Cohen, S. N. et al., Proc. Natl. Acac. Sci. USA, 9:2110-2114 (1973)), Hanahan Method (Cohen, S. N. et al., Proc. Natl. Acac. Sci. USA, 9:2110-2114 (1973); and Hanahan, D., J. Mol. Biol., 166: 557-580 (1983)) and electroporation methods (Dower, W. J. et al., Nucleic. Acids Res., 16:6127-6145 (1988)), and the like. Further, when the host cell is a eukaryotic cell, the vector may be injected into the host cell by a microinjection method (Capecchi, M. R., Cell, 22:479 (1980)), a calcium phosphate precipitation method (Graham, F. L. et al., Virology, 52:456 (1973)), an electroporation method (Neumann, E. et al., EMBO J., 1:841 (1982)), a liposome-mediated transfection method (Wong, T. K. et al., Gene, 10:87 (1980)), a DEAE-dextran treatment method (Gopal, Mol. Cell Biol., 5:1188-1190 (1985)), and a gene bombardment method (Yang et al., Proc. Natl. Acad. Sci., 87:9568-9572 (1990)), or the like.

In the present invention, a recombinant vector injected into the host cell can express the protein of the present invention recombined in the host cell, and in this case, a large amount of protein is obtained. For example, when the expression vector includes a lac promoter, host cells can be treated with IPTG to induce gene expression.

Cultivation of the transformed host cell can be performed by known host cell cultivation methods or modified methods thereof. For example, when the host cell is *E. coli*, the medium for culturing the transformed host cell includes a carbon source, a nitrogen source, an inorganic salt, etc. that can be efficiently used by *E. coli*, and a natural medium or a synthetic medium may be used. Carbon sources that can be used include carbohydrates such as glucose, fructose, sucrose; starch, starch hydrolyzate; organic acids such as acetic acid and propionic acid; alcohols such as ethanol, propanol, and glycerol, and the like. The nitrogen source includes ammonia; ammonium salts of inorganic or organic acids such as ammonium chloride, ammonium sulfate, ammonium acetate and ammonium phosphate; peptone, meat extract, yeast extract, corn steep liquor, casein hydrolyzate, soybean extract, soybean hydrolyzate; various fermented cells and their decomposition products, and the like. The inorganic salt includes potassium dihydrogen phosphate, dipotassium hydrogen phosphate, magnesium phosphate, magnesium sulfate, sodium chloride, manganese sulfate, copper sulfate, calcium carbonate, and the like.

Cultivation is typically performed under aerobic conditions, such as by shaking culture or spinning on a rotator. The cultivation temperature is preferably in the range of 10° C. to 40° C., and the cultivation time is generally 5 hours to 7 days. The pH of the medium is preferably maintained in the range of 3.0 to 9.0 during cultivation. The pH of the medium can be adjusted with inorganic or organic acids, alkaline solutions, urea, calcium carbonate, ammonia, and the like. During cultivation, antibiotics such as ampicillin, streptomycin, chloramphenicol, kanamycin and tetracycline may be added as needed for maintenance and expression of the recombinant vector. When culturing a host cell transformed with a recombinant expression vector having an inducible promoter, a suitable inducer can be added to the medium as needed. For example, when the expression vector contains the lac promoter, IPTG (isopropyl-β-D-thiogalactopyranoside) can be added, and when the expression vector contains the trp promoter, indoleacrylic acid can be added to the medium.

According to yet another aspect of the present invention, there is provided a pharmaceutical composition for preventing or treating cancer comprising the protein of the present invention.

Since the pharmaceutical composition of the present invention uses the above-mentioned protein of the present invention as an active ingredient, the common contents between the two are omitted in order to avoid excessive complexity of the present specification.

As used herein, the term "cancer" collectively refers to diseases caused by cells having an aggressive property in which cells divide and grow ignoring normal growth limits, an invasive property of penetrating into surrounding tissues, and a metastatic property of spreading to other parts of the body. As used herein, the term "cancer" includes, but is not limited to, a primary cancer, a recurrent cancer, a drug-resistant cancer, the "primary cancer" refers to a common cancer, the "recurrent cancer" means a cancer that has recurred after conventional cancer treatment, and the "drug-resistant cancer" refers to a cancer that exhibits very low sensitivity to the cancer treatment, and thus, does not improve, relieve, alleviate, or treat disease symptoms by the treatment. Here, the conventional cancer treatment may include surgery, chemotherapy, radiation therapy, hormone therapy, biological therapy, immunotherapy, and the like, but is not limited thereto. In addition, "metastatic cancer" means that a primary cancer or recurrent cancer occurring at a specific site has metastasized to another site.

In many carcinomas, since cancer cells overexpress anti-apoptotic BLC-2 family proteins to evade apoptosis and grow sustainably, the pharmaceutical composition of the present invention using the protein of the present invention as an active ingredient can be effectively used for the prevention or treatment of cancer.

In one embodiment of the present invention, the protein of the present invention can promote apoptosis to induce apoptosis of cancer cells.

In one embodiment of the present invention, the cancer may be selected from the group consisting of non-Hodgkin lymphoma, Hodgkin lymphoma, acute-myeloid leukemia, acute-lymphoid leukemia, multiple myeloma, head and neck cancer, lung cancer, non-small cell lung cancer, glioblastoma, esophageal cancer, gastric cancer, colorectal cancer, rectal cancer, colon cancer, oral cancer, pharyngeal cancer, laryngeal cancer, pancreatic cancer, breast cancer, cervical cancer, endometrial cancer, ovarian cancer, malignant melanoma, prostate cancer, testicular cancer, bladder cancer, kidney cancer, liver cancer, pancreatic cancer, bone cancer, connective tissue cancer, skin cancer, brain cancer, thyroid cancer and mesothelioma, but is not limited thereto.

In one embodiment of the present invention, the pharmaceutical composition of the present invention may further include a pharmaceutically acceptable excipient, a carrier, or a diluent. The "pharmaceutically acceptable" is one in which the formulation is sterile and pyrogen-free. Suitable pharmaceutical carriers are well known in the pharmaceutical art. The carrier(s) should be "acceptable" in the sense of not adversely affecting the efficacy of the active ingredient of the present invention and being not harmful to its recipient. Typically, the carrier will be sterile, pyrogen-free water or saline. However, other acceptable carriers can be used. Thus, "pharmaceutically acceptable carrier" and "pharmaceutically acceptable excipient" include compound(s) used to form part of a formulation, which compounds are intended solely to act as carriers, i.e., are not intended to have a biological activity by itself. Pharmaceutically acceptable carriers or excipients are generally safe and non-toxic. A pharmaceutically acceptable carrier and/or excipient as used herein includes both one or more carriers and/or excipients.

Pharmaceutically acceptable carriers included in the pharmaceutical composition of the present invention are those commonly used for the formulation, and include lactose, dextrose, sucrose, sorbitol, mannitol, starch, acacia gum, calcium phosphate, alginate, gelatin, calcium silicate, microcrystalline cellulose, polyvinylpyrrolidone, cellulose, water, syrup, methylcellulose, methyl hydroxybenzoate, propylhydroxybenzoate, talc, magnesium stearate, mineral oil, and the like, but is not limited thereto.

Excipients may be one or more carbohydrates, polymers, lipids and minerals. Examples of carbohydrates include lactose, sucrose, mannitol, and cyclodextrins, which are added to the composition, for example, to enable lyophilization. Examples of polymers include starch, cellulose ether, cellulose carboxymethylcellulose, hydroxypropylmethyl cellulose, hydroxyethyl cellulose, ethylhydroxyethyl cellulose, alginate, carrageenan, hyaluronic acid and its derivatives; polyacrylic acid, polysulfonate, polyethylene glycol/polyethylene oxide, polyethylene oxide/polypropylene oxide copolymer, polyvinyl alcohol/polyvinyl acetate with different degrees of hydrolysis, and polyvinylpyrrolidone with all different molecular weights, which are added to the composition, for example, in order to adjust viscosity, to achieve adhesion, or to protect lipids from chemical and proteolytic degradation. Examples of lipids include fatty acids, phospholipid, phosphoric acid, mono-, di-, and triglyceride, ceramide, sphingolipid and glycolipid with all different acyl chain lengths and saturation; egg lecithin, soy lecithin, hydrogenated egg and soy lecithin, which are added to the composition for reasons similar to those for polymers. Examples of minerals are talc, magnesium oxide, zinc oxide and titanium oxide, which are added to the composition to obtain advantages such as reduced liquid build-up or advantageous pigment properties.

A diluent is intended to mean an aqueous or non-aqueous solution having the purpose of diluting the peptide in pharmaceutical preparation. The diluent may be one or more of saline, water, polyethylene glycol, propylene glycol, ethanol or an oil (such as safflower oil, corn oil, peanut oil, cottonseed oil or sesame oil).

The diluent may also function as a buffer. The term "buffer" is intended to mean an aqueous solution containing an acid-base mixture having the purpose of stabilizing the pH. Examples of buffers include Trizma, Bicine, Tricine, MOPS, MOPSO, MOBS, Tris, Hepes, HEPBS, MES, phosphate, carbonate, acetate, citrate, glycolate, lactate, borate, ACES, ADA, tartrate, AMP, AMPD, AMPSO, BES, CABS, cacodylate, CHES, DIPSO, EPPS, ethanolamine, glycine, HEPPSO, imidazole, imidazolamic acid, PIPES, SSC, SSPE, POPSO, TAPS, TABS, TAPSO and TES.

The pharmaceutical composition of the present invention may further include lubricants, wetting agents, sweeteners, flavoring agents, emulsifiers, suspending agents, preservatives, and the like, in addition to the above components. Suitable pharmaceutically acceptable carriers and agents are described in detail in Remington's Pharmaceutical Sciences (19th ed., 1995).

The pharmaceutical composition of the present invention may further include a lubricant, a wetting agent, a sweetening agent, a flavoring agent, an emulsifying agent, a suspending agent, a preservative, and the like, in addition to the above components. Suitable pharmaceutically acceptable carriers and agents are described in detail in Remington's Pharmaceutical Sciences (19th ed., 1995).

The pharmaceutical composition of the present invention may be administered orally or parenterally, and for examples, the composition can be administered intravenously, subcutaneously, intramuscularly, intraperitoneally, intrathecally, intracerebrally, intrasternally, topically, intranasally, intrapulmonally, rectally, and the like, but are not limited thereto.

A suitable dosage of the pharmaceutical composition of the present invention varies depending on factors such as formulation methods, administration methods, the patient's age, body weight, sex, severity of diseases, diet, administration time, administration route, excretion rate, and response sensitivity of the patient, and an ordinarily skilled physician can readily determine and prescribe an effective dosage for the desired treatment or prophylaxis. According to a preferrable embodiment of the present invention, the daily dosage of the pharmaceutical composition of the present invention is 0.0001-100 mg/kg. As used herein, the term "pharmaceutically effective amount" refers to an amount sufficient to prevent or treat the above-mentioned diseases.

As used herein, the term "prevention" means prophylactic or protective treatment for a disease or disease condition. As used herein, the term "treatment" means a reduction, suppression, amelioration, or eradication of a disease condition.

The pharmaceutical composition of the present invention is formulated using a pharmaceutically acceptable carrier and/or excipient in accordance with the method that can be easily carried out by a person having ordinary knowledge in the technical field to which the invention belongs, so that it can be manufactured in unit dose form or can be manufactured by incorporating into multi-dose containers. At this time, the formulation may be in the form of a solution, suspension or emulsion in an oil or aqueous medium, or in the form of an X-lot, powders, suppositories, powders, granules, tablets or capsules, and may further include dispersants or stabilizers.

The pharmaceutical composition of the present invention may also be used in combination with other pharmaceutically active agents and therapies in addition to the active ingredients described above. The "combination" may be expressed as simultaneous or combined administration.

The pharmaceutical composition of the present invention may further be used in combination with other methods of treating cancer by chemotherapy, radiotherapy, tumor-targeted therapy, adjuvant therapy, immunotherapy or surgery.

The therapeutic agents that can be used in combination with the pharmaceutical composition of the present invention described above include one or more chemotherapeutic agents (e.g., Asparaginase, Busulfan, Carboplatin, Cisplatin, Daunorubicin, Doxorubicin, Fluorouracil, Gemcitabine, Hydroxyurea, Methotrexate, Paclitaxel, Rituximab, Vinblastine, Vincristine), one or more targeted therapeutic agents (e.g., bevacizumab, olaparib), and PD-1/PD-L1-specific immune checkpoint inhibitors (e.g., Nivolumab, Pembrolizumab, Atezolizumab, Durvalumab, Avelumab, Semiflumab, Atezolizumab, Abelumab, Tislerizumab, Spartalizumab (PDR001), Setrelimab (JNJ-63723283), Torifalimab (JS001), Camrelizumab (SHR-1210), Scintilimab (IBI308), AB122(GLS-010), AMP-224, AMP-514/MEDI-0680, BMS936559, JTX-4014, BGB-108, SHR-1210, MEDI4736, FAZ053, BCD-100, KN035, CS1001, BAT1306, LZM009, AK105, HLX10, SHR-1316, CBT-502(TQB2450), A167 (KL-A167), STI-A101(ZKAB001), CK-301, BGB-A333, MSB-2311, HLX20, TSR-042, or LY3300054), that are known in the art, but are not limited thereto.

According to still another aspect of the present invention, there is provided a method of treating cancer comprising administering to a subject in need thereof a pharmaceutical composition comprising the above-mentioned protein of the present invention as an active ingredient.

The cancer, which is the target disease of the treatment method of the present invention, is the same as defined in relation to the target disease of the pharmaceutical composition.

In one embodiment of the present invention, the subject is a mammal or a human.

Since the method of treating cancer of the present invention is a method of administering the above-mentioned pharmaceutical composition to a subject, duplicate contents are omitted to avoid excessive complication of the present specification.

Advantageous Effects

The present invention relates to a protein that simultaneously binds to both MCL-1 and BCL-xL and uses thereof. The protein of the present invention simultaneously and specifically binds to both MCL-1 and BCL-xL, which are anti-apoptotic BCL-2 family proteins whose expression is increased in various carcinomas, and thus can be usefully applied to the prevention or treatment of cancer.

DETAILED DESCRIPTION OF THE EMBODIMENTS

Figure 1A:
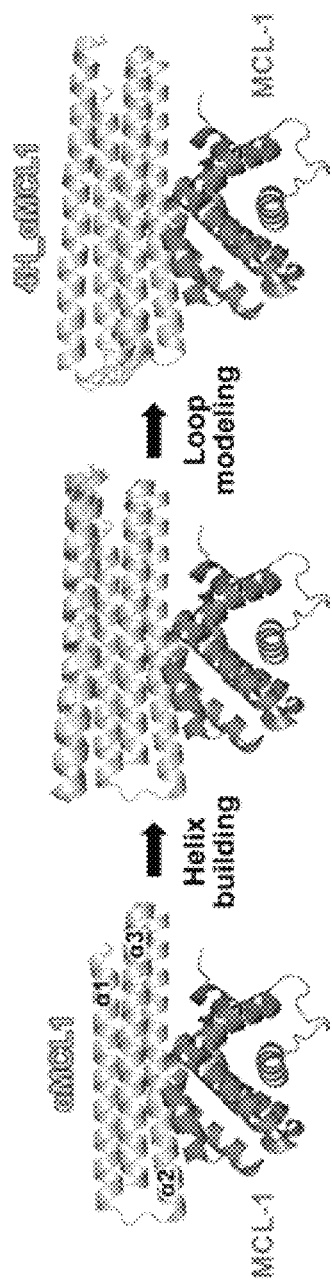
FIG. 1a shows the computational design process of 4H_αMCL1.

Hereinafter, the present invention will be described in more detail with reference to examples. It would be obvious to those skilled in the art that these examples are intended to be more concretely illustrative and the scope of the present invention as set forth in the appended claims is not limited to or by the examples.

EXAMPLE

Experimental Material and Experimental Method

1. Computational Design

The Rosetta software was used to design the protein, and the BundleGridSampler mover was used to generate a set of fourth helices to add to αMCL1. Then, the models were visually inspected and interface designs were generated for the area within 6 Å of the surfaces of αMCL1 and each fourth helix. One of the resulting two hundred design models was selected based on total energy score, ΔΔG, interface shape complementarity, and a visual inspection. The Remodel mover was used to link the fourth helix to the C-terminus of αMCL1, and the FastDesign mover was used for the sequence design of the fourth helix and its interface with αMCL1. The crystal structure of BCL-xL in complex with BIM BH3 peptide (PDB entry: 3FLD) [34] was used for motif grafting the BH3 sequence onto the fourth helix with seven residues designated as hotspot residues. Apart from these hotspot residues, all residues of the four-helix bundle within 8.3 Å of BCL-xL were subjected to sequence design. Eight of the five hundred resulting design models were selected based on total energy score, ΔΔG, interface shape complementarity, and a visual inspection. In the second round of the design, the crystal structure of 4H_αBM_1 in complex with BCL-xL was used for sequence optimization, with only six residues allowed to change.

2. Protein Expression, Purification, and Size-Exclusion Chromatography

DNA fragments encoding the designed proteins were synthesized (IDT) and cloned into pJK hTx or pCW57.1 vectors for protein expression in *E. coli* or mammalian cells, respectively. BCL-2 family proteins were also expressed from the pJK hTx vector. The BCL-2 family protein constructs were BCL-2 (1-34:chimeric loop:92-203), BCL-B (1-177;C30S/C138S), BCL-W (1-164), BCL-xL (1-44:85-209), BFL-1 (1-151;C4S/C19S), MCL-1 (172-321). For biotinylating the BCL-2 family proteins, BirA was expressed from the pCDFduet vector with BCL-2 proteins that included a C-terminal biotinylation sequence (GLNDIFEAQKIEWHE). Proteins were expressed at 18° C. in the *E. coli* Lemo(DE3) strain, grown in TB medium. Cells were collected by centrifugation, resuspended, and lysed by sonication. Supernatants were loaded onto pre-equilibrated Co-NTA resin (Thermo Fisher Scientific), and bound proteins were eluted with a buffer solution containing 100 mM NaCl, 20 mM Tris (pH 7.5), and 150 mM imidazole. The eluted proteins were further purified by size-exclusion chromatography using a HiLoad 26/60 Superdex 75 column (GE Healthcare). For a qualitative binding assay, purified proteins were loaded onto a Superdex 75 Increase 10/300 GL column (GE Healthcare) and the apparent mass of the protein complexes was estimated based on the elution of size marker proteins.

3. Crystallization and Structure Determination

4H_αBM_1 (SEQ ID NO: 3) or 4H_αBM_2 (SEQ ID NO: 4) was mixed with BCL-xL and the resulting complexes were isolated by size-exclusion chromatography using a HiLoad 26/60 Superdex 75 column (GE Healthcare). 4H_αBM_2 bound to MCL-1 was purified using the same method. Crystals were obtained by the hanging-drop vapor diffusion method at 20° C. Crystals of 4H_αBM_1-BCL-xL were obtained by mixing the complex (52.3 mg/ml) with a precipitant solution containing 4% PEG 3,000 (w/v) and 0.1 M sodium acetate (pH 4.5). Crystals of 4H_αBM_2-BCL-xL were obtained by mixing the complex (55 mg/ml) with a precipitant solution containing 10% PEG 10,000 (w/v) and 0.1 M sodium acetate (pH 4.5). Crystals of 4H_αBM_2-MCL-1 were obtained by mixing the complex (23.5 mg/ml) with precipitant solution containing 12% PEG 6,000 (w/v), 0.1 M magnesium chloride, and 0.1 M ADA (pH 6.5). The crystals were immersed briefly in a cryoprotectant solution. The cryoprotectant solution was the same as the reservoir solution with an additional 17.5% ethylene glycol for the 4H_αBM_1-BCL-xL and 4H_αBM_2-MCL-1 crystals or 17% glycerol for the 4H_αBM_2-BCL-xL crystals. X-ray diffraction datasets were collected on beamline 5C at Pohang Accelerator Laboratory, South Korea. The structure of the 4H_αBM_1-BCL-xL complex was determined via the single anomalous dispersion method. Then, automatic model building into the electron densities and structure refinement were performed using the PHENIX software suit. The structures of the 4H_αBM_2-BCL-xL and the 4H_αBM_2-MCL-1 complexes were determined via molecular replacement using their respective design models as search models, followed by structure refinement using PHENIX. Iterative rounds of manual model building and refinement were carried out using the programs COOT and PHENIX. All structures were illustrated using the PYMOL software. Crystallographic data statistics are summarized in Table 1 below.

TABLE 1

X-ray data collection and structure refinement statistics.

| Data collection | 4H_αBM_1-BCl-xL | 4H_αBM_2-BCL-xL | 4H_αBM_2-MCL-1 |
|---|---|---|---|
| X-ray source[2] | BL5C, PAL | BL5C, PAL | BL5C, PAL |
| Space group | P1 | P1 | P1 |
| Unit cell dimensions | | | |
| a, b, c (Å) | 60.61, 68.54, 80.52 | 60.93, 69.05, 79.99 | 67.99, 74.77, 92.16 |
| α, β, γ (°) | 100.89, 110.57, 108.73 | 100.79, 110.00, 108.67 | 70.83, 89.59, 67.58 |
| Wavelength (Å) | 0.97403 | 0.97959 | 0.97959 |
| Resolution (Å) | 50.0-1.9 (1.93-1.90) | 29.21-1.9 (1.97-1.90) | 29.46-2.38 (2.47-2.38) |
| $R_{sym}$ (%) | 8.7 (32.2)[b] | 6.6 (79.1)[b] | 4.8 (63.6) |
| I/σ(I) | 21.8 (2.8) | 10.8 (1.3) | 14.0 (1.8) |
| Completeness (%) | 96.7 (95.3) | 96.68 (95.81) | 97.36 (96.94) |
| Redundancy | 3.6 (3.1) | 3.7 (3.48) | 3.6 (3.64) |
| Refinement | | | |
| Resolution (Å) | 38.1-1.9 | 29.21-1.9 | 29.46-2.38 |
| No. of reflections | 162.019 | 83.334 | 61.287 |
| $R_{work}/R_{free}$ (%) | 16.57/19.67 | 17.15/20.61 | 20.24/24.03 |

TABLE 1-continued

X-ray data collection and structure refinement statistics.

| Data collection | 4H_αBM_1-BCl-xL | 4H_αBM_2-BCL-xL | 4H_αBM_2-MCL-1 |
|---|---|---|---|
| R.m.s deviations | | | |
| bond length (Å)/angle (°) | 0.016/1.66 | 0.007/0.781 | 0.006/1.009 |
| Average B-values (Å$^2$) | 32.94 | 41.36 | 70.89 |
| Ramachandran plot (%) | | | |
| Favored | 98.1 | 98.1 | 98.4 |
| Allowed | 1.9 | 1.9 | 1.6 |

[a]Beamline 5C at Pohang Accelerator Laboratory.
[b]The numbers in parentheses are the statistics from the highest resolution shell.

4. Surface Plasmon Resonance (SPR)

SPR data were collected on an 8 K device (GE Healthcare). A Series S Biotin CAPture kit (GE Healthcare) was used to immobilize biotinylated anti-apoptotic BCL-2 proteins, and all experiments were conducted in HBS-EP+ buffer solution (10 mM HEPES, 150 mM NaCl, 3 mM EDTA, 0.005% Surfactant P20; GE Healthcare). Biotinylated anti-apoptotic BCL-2 proteins were immobilized on the CAP chip until the response units reached 100. Serially diluted analytes were injected at a flow rate of 30 μl/min. Analytes were used at 20 nM for single concentration experiments. Dissociation constants ($K_D$) and kinetic parameters ($K_a$ and $K_d$) were estimated using Biacore 8 K evaluation software (GE Healthcare).

5. Cell Culture

HEK293T, A375, MEWO, SW620, HCT-116, and K562 cell lines were maintained in DMEM supplemented with an antibiotic-antimycotic solution and 10% FBS. All cell lines were incubated at 37° C. in a humidified incubator containing 5% $CO_2$.

6. Lentivirus Production and Infection

The pCW57.1 lentiviral vector was used for cloning 3×FLAG-tagged proteins and for generating lentivirus. HEK293T cells grown in T25 flasks were transfected with 2.7 μg of pCW57.1, 1.4 μg of pRSV-REV, 1.9 μg of pMD2.G, and 2.9 μg of pMDL g/p RRE vectors (Addgene #41393, #12253, #12259, and #12251, respectively) using Lipofectamine 3000 (GE Healthcare) according to the manufacturer's instructions. Viral supernatants were harvested and filtered using a 0.45 μm polyethersulfone filter 72 h after transfection. Supernatants containing viruses were used immediately or stored in aliquots at −80° C. A375, MEWO, SW620, HCT-116, and K562 cells were infected with each viral supernatant along with 8 μg/ml polybrene. Infected pools were then selected by 2 μg/ml puromycin treatment after a 48 h incubation at 37° C. Puromycin-resistant pools were used following cell viability assays and western blot analyses with and without 2 μg/ml doxycycline.

7. Cell Viability Assay

Cell viability was determined using the WST-1 reagent (Roche) according to the manufacturer's instructions. Successfully transduced cell lines were seeded on 96-well plates at 5000 cells per well in 100 μl culture medium. After a 24 h incubation, 2 μg/ml of doxycycline was added to the culture medium to induce protein expression. A 100-fold lower doxycycline concentration was used for BIM expression. WST-1 reagent was added after a 12 h incubation, and absorbance was measured at 450 nm and 690 nm using a Spark 10 M microplate reader (Tecan).

2.8. Western Blot Analysis

Cells were harvested 12 h after doxycycline treatment and lysed in RIPA buffer (Thermo Fisher Scientific) supplemented with a protease inhibitor cocktail (Quartett) and a phosphatase inhibitor cocktail (Sigma). For BIM detection, the pan-caspase inhibitor Z-VAD-FMK (MedChemExpress) was added 30 min prior to the addition of doxycycline. The cell lysates were then incubated for 1 h on ice and centrifuged at 15,000 g for 30 min at 4° C. Total protein concentrations for the whole-cell lysates were measured using a BCA protein assay kit (Thermo Fisher Scientific). Equal amounts of the lysates were resolved on SDS-PAGE gels and transferred to PVDF membranes. These were then incubated with primary antibody overnight at 4° C., washed three times with TBS-T buffer and incubated with a secondary antibody for 1 h at room temperature. Chemiluminescence was generated with ECL Western Blotting Substrate (Thermo Fisher Scientific) and detected using a ChemiDoc MP (Bio-Rad). All images were analyzed using Image Lab (Bio-Rad). The antibodies used for the western blots were: anti-FLAG (Sigma, F1804), anti-BCL-xL (Abcam, ab32370), anti-MCL-1 (Abcam, ab32087), anti-γ-H2A.X (Abcam, ab81299), anti-PARP (Abcam, 191217), anti-β-actin (Abcam, ab6276), HRP-conjugated anti-rabbit IgG (Abcam, ab205718), and HRP-conjugated anti-mouse IgG (Abcam, ab6728).

<Example 1> Computational Design of a BCL-xL/MCL-1 Binding Protein

Figure 1B:
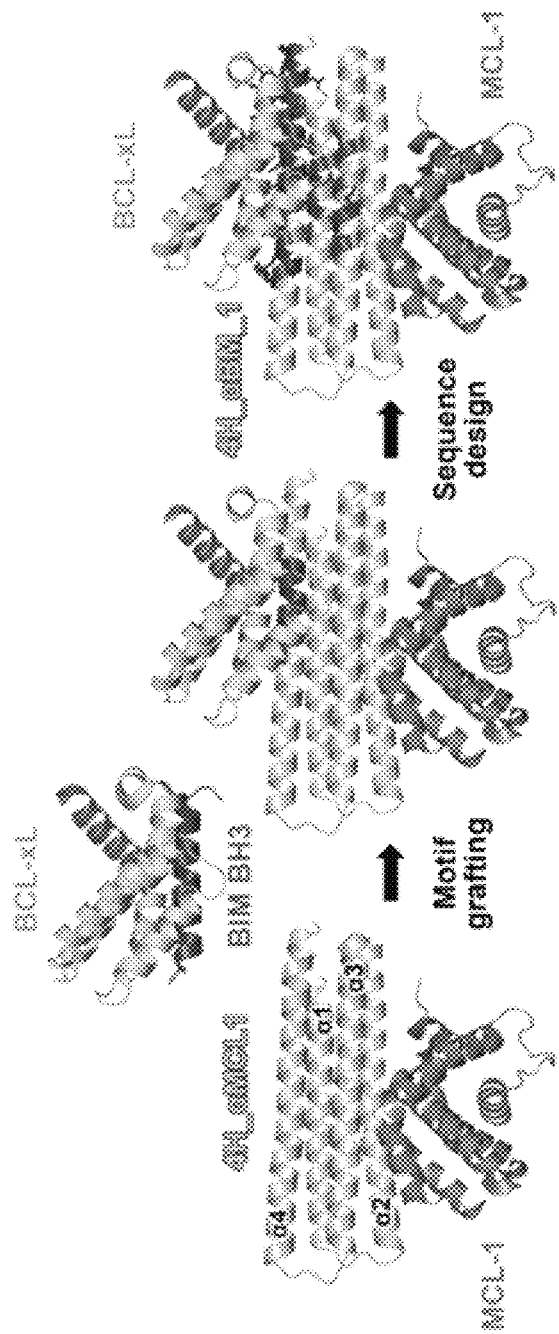
FIG. 1b shows the process of engrafting the BIM BH3 sequence of the BCL-xL-BIM BH3 structure to the fourth helix of 4H_αMCL1.

Starting with αMCL1 (SEQ ID NO: 1), which is a protein having three-helix bundle structure, a protein that simultaneously binds to both MCL-1 and BCL-xL was designed. αMCL1 is a de novo designed protein, which binds tightly and specifically to MCL-1 with a dissociation constant ($K_D$) of 150 pM. This protein has a BH3-like motif in its second helix that is responsible for its interaction with MCL-1. This is clear in the αMCL1-MCL-1 co-crystal structure (PDB entry: 5JSB). In addition to this primary site of intermolecular interaction, the other two helices also contribute to MCL-1 binding, improving its specificity. Using α-helix building, loop modeling, and interface sequence design with the Rosetta software suite, a total of 200 four-helix bundles were generated (FIG. 1a). Based on the Rosetta all-atom energy values and visual inspection, one of the output models for further experiments was selected, and designated as 4H_αMCL1 (SEQ ID NO: 2). 4H_αMCL1 was used as a template upon which to engraft the crystal structure of BCL-xL bound to the BIM BH3 peptide. Onto the fourth helix, the motif grafting protocol in Rosetta with the "hot-spot" option was used to maintain the seven highly conserved BH$_3$ residues of BIM (i.e., Ile148, Ala149, Leu152, Ile155, Gly156, Asp157, and Phe159). Next, the resulting output models were subjected to further sequence design in which any residues within 8.3~10 Å from BCL-xL (apart from the hotspot residues) were allowed to change and those within 8.3~10 Å from BCL-xL were restricted to repacking. A total of 500 models were then evaluated according to the following filtering criteria: Rosetta all-atom energy <–660, interface shape complementarity >0.62, and buried unsatisfied polar atoms ≤3 (FIG. 1b). Considering the high success rate of motif grafting in general, the eight best designs were selected after visual inspection. All were then cloned and produced in E. coli for experimental validation.

<Example 2> Biochemical and Structural Validation of the BCL-xL/MCL-1 Binding Proteins-Design of 4H_αBM_1

Figure 2A:
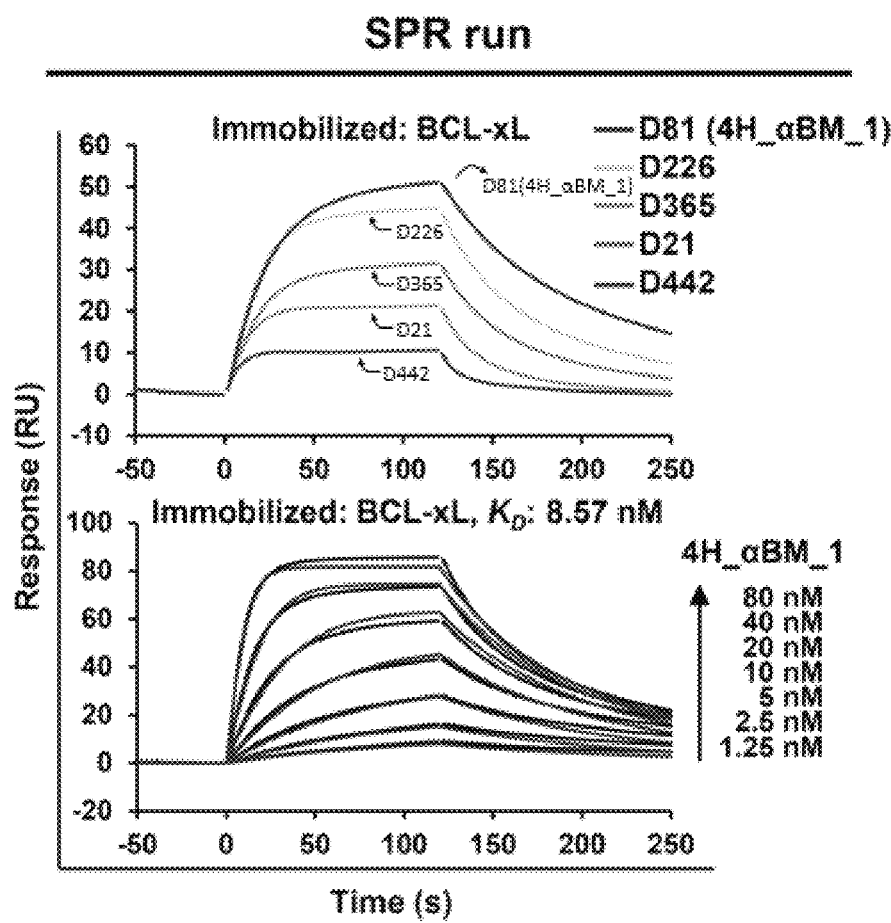
FIG. 2a shows the model screening, selection, $K_D$ measurement of BCL-xL/MCL-1 binding protein through surface plasmon resonance (SPR).
Figure 2B:
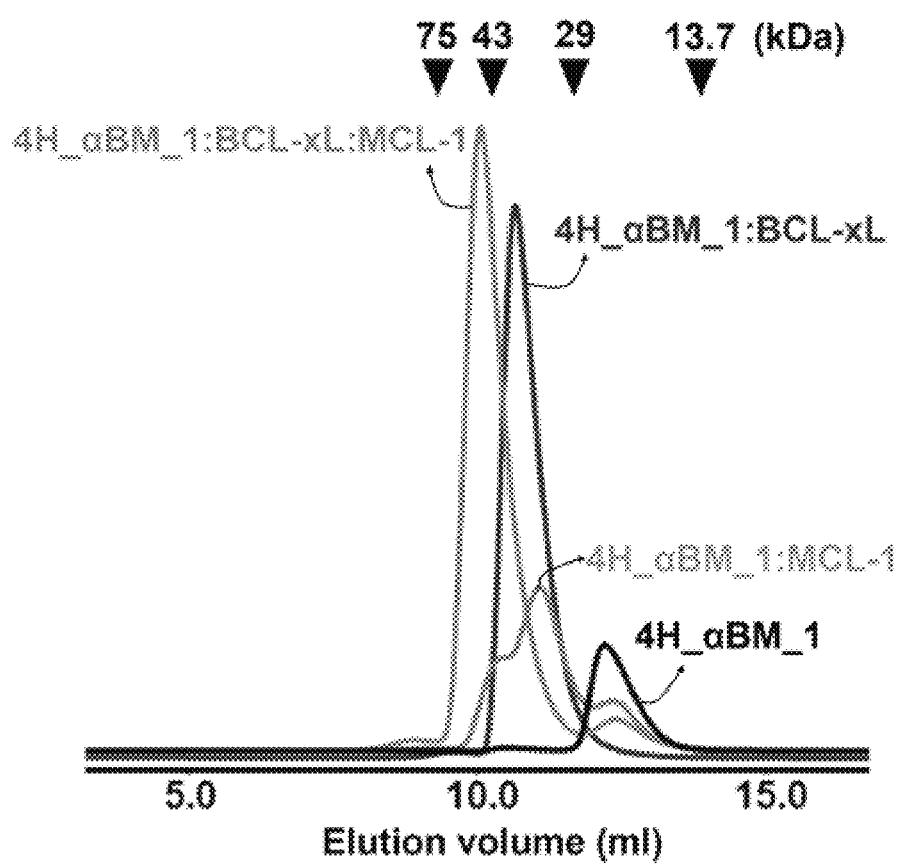
FIG. 2b shows the size-exclusion chromatography results.

Among the eight designs selected for further experiments, five were highly soluble and were able to purify to homogeneity. Using surface plasmon resonance (SPR), their binding to BCL-xL was evaluated, and the design with the strongest binding (D81) was selected and designed as 4H_αBM_1 (SEQ ID NO: 3) (FIG. 2a). By performing SPR runs with different concentrations of the selected design, its dissociation constant ($K_D$) was measured to be 8.57 nM (FIG. 2a). Using size-exclusion chromatography, it was found this protein can bind to MCL-1 alone, as well as to both BCL-xL and MCL-1 simultaneously. As a result, it was found that the MCL-1 binding site is intact in 4H_αBM_1 and that BCL-xL and MCL-1 can bind simultaneously without steric hindrance (FIG. 2b).

Figure 2C:
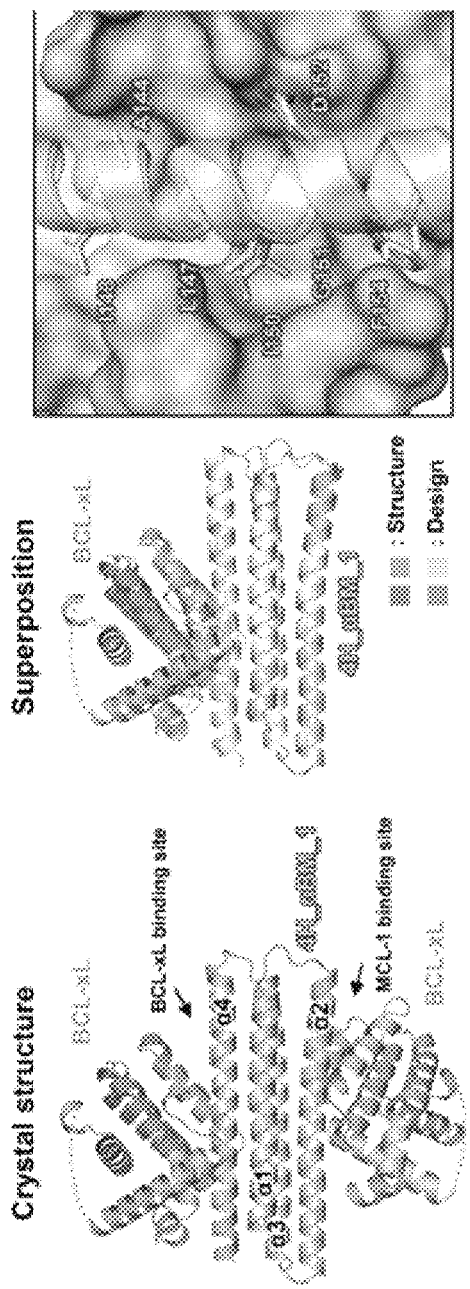
FIG. 2c shows the crystal structure of 4H_αBM_1-BCL-xL. BCL-xL binds to both the BCL-xL binding site and the MCL-1 binding site (left), and the crystal structure is closely superimposed with the designed model with a Cα RMSD of 1.062 Å (center). The figure on the right shows the conserved hotspot residues.
Figure 2D:
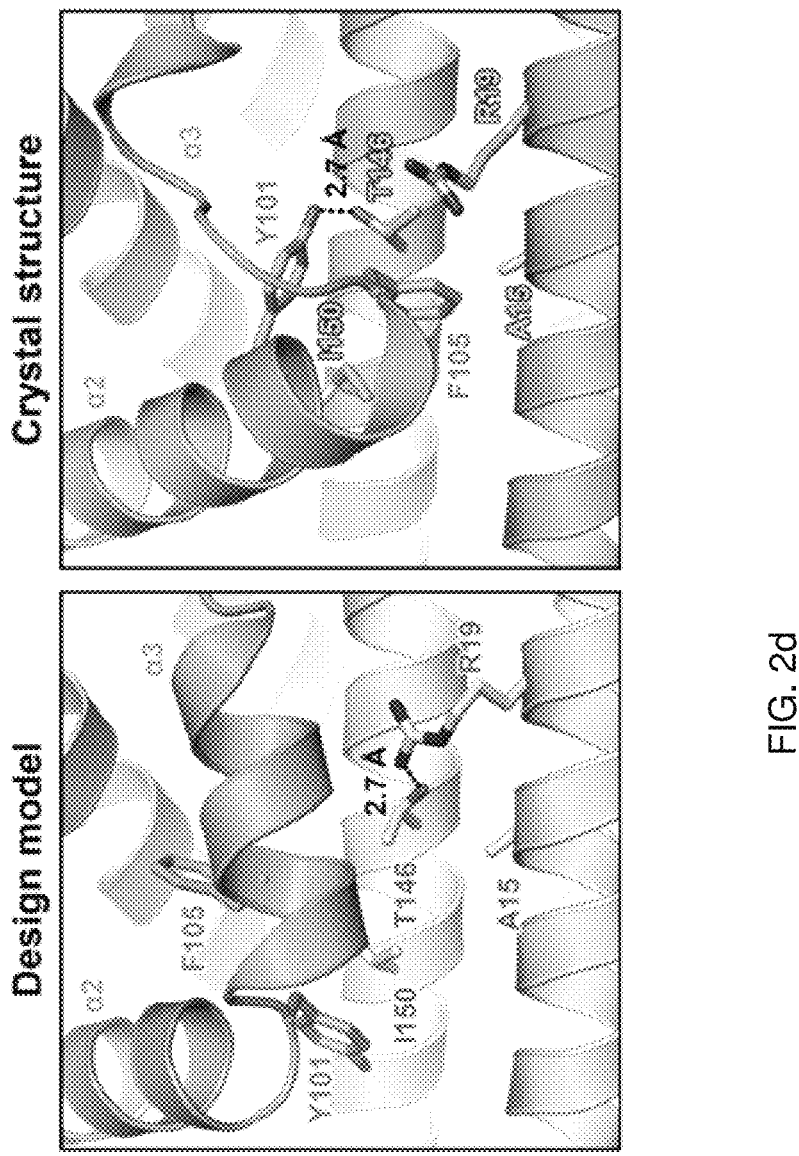
FIG. 2d shows the conformational changes in the helices α2 and α3 of BCL-xL.

Next, the crystal structure of 4H_αBM_1-BCL-xL was determined (Table 1). Since αMCL1 has a low affinity for BCL-xL ($K_D$=340 pM), it was expected that 4H_αBM_1 and BCL-xL form a 1:1 complex. In the crystal structure, however, BCL-xL binds to both the MCL-1 binding site and the designed BCL-xL binding site. This is likely either because of the high concentration of protein used during crystallization or because crystal packing interactions promote the binding of BCL-xL to the MCL-1 binding site. The structure we determined is closely superposable onto the designed model with a Cα root mean square deviation (RMSD) of 1.062 Å, confirming that the 4H_αBM_1 design was largely correct (FIG. 2c). Meanwhile, in the designed model, a conformational change was shown in BCL-xL helices α2 and α3. In comparison with the original conformation, a one-turn extension of helix α2 and a loosened helical propensity of helix α3 were observed (FIG. 2d). In light of the fact that the altered BCL-xL p segment is not involved in any major crystal packing interactions, this conformational change is likely due to the formation of a more favorable interaction with 4H_αBM_1. Similar conformations are found in other crystal structures of BCL-xL bound to BH3 peptides, suggesting that this segment of BCL-xL adopts one of two alternative conformations in a context-dependent manner.

<Example 3> Further Computational Design Based on the Crystal Structure of 4H_αBM_1-BCL-xL-Design of 4H_αBM_2

Figure 3A:
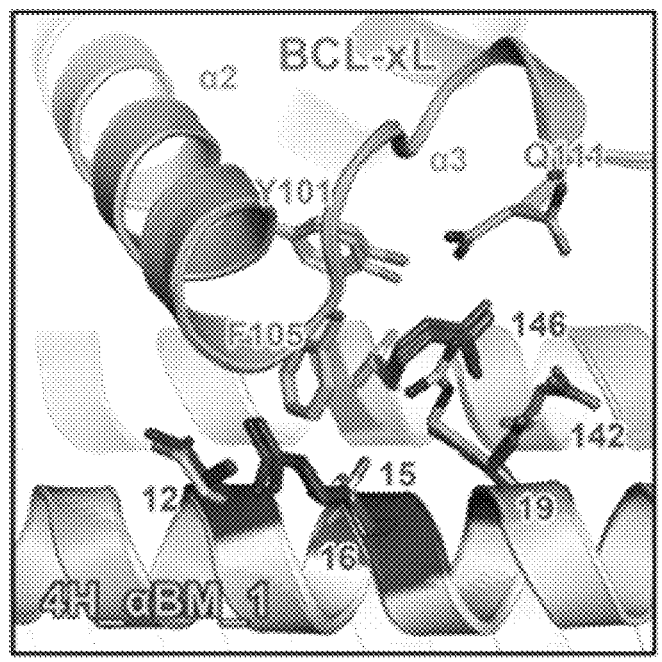
FIG. 3a shows the sequence design process for optimizing the local interaction of BCL-xL with helices α2 and α3.
Figure 3B:
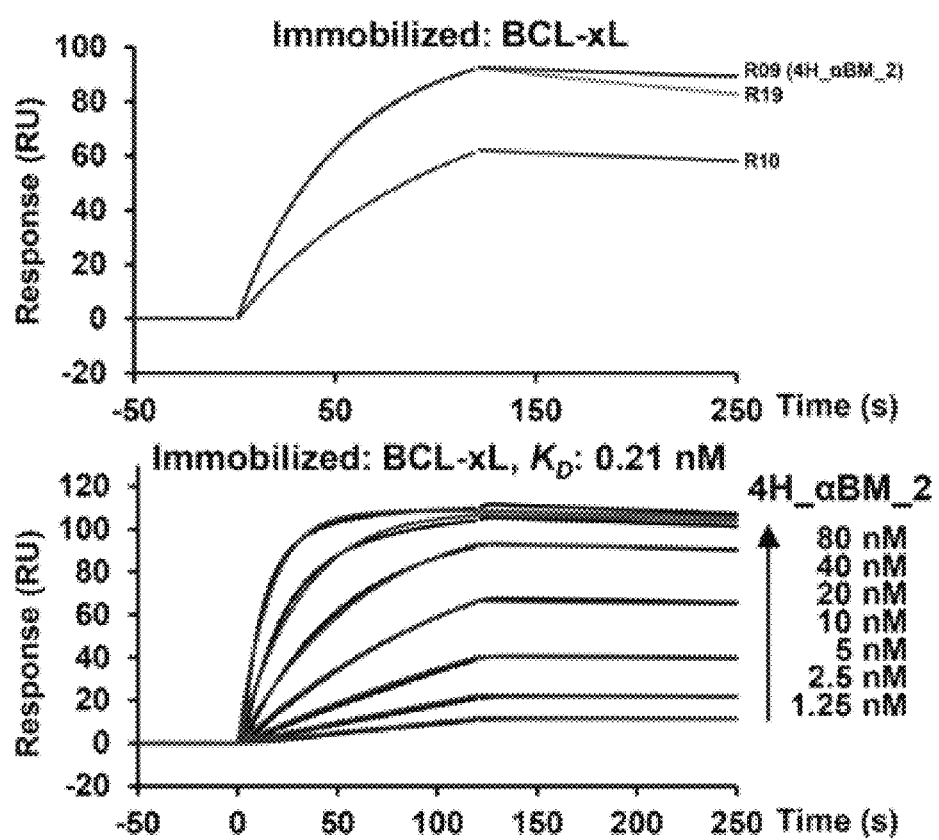
FIG. 3b shows the results of SPR analysis of three models selected after sequence design.

If the altered conformation is more energetically favorable for binding to 4H_αBM_1, then it invalidates amino acid sampling near BCL-xL helices α2 and α3 in the sequence design step. Using the crystal structure as the template, an attempt was conducted to optimize local interactions with α2 and α3 by sequence design of six selected residues that fall within 8 Å of the two helices: Asp12, Ala15, Asn16, Arg19, Ala142, and Thr146 (FIG. 3a). Three of 50 resulting models were selected using the same criteria previously described and their binding affinity for BCL-xL was estimated. Compared to 4H_αBM_1, all three designs exhibited enhanced binding affinity in the SPR analysis at a single analyte concentration (FIG. 3b). The model with the greatest binding affinity was a model designed by substituting Ile for the 12th amino acid residue Asp, Arg for the 16th amino acid residue Asn, Thr for the 19th amino acid residue Arg, Glu for the 142nd amino acid residue Ala, and Arg for the 146th amino acid residue, which was designated as "4H_αBM_2" (SEQ ID NO: 4). The $K_D$ of 4H_αBM_2 to BCL-xL was 0.21 nM, indicating a 40-fold stronger binding than 4H_αBM_1 ($K_D$=8.57 nM).

Figure 3C:
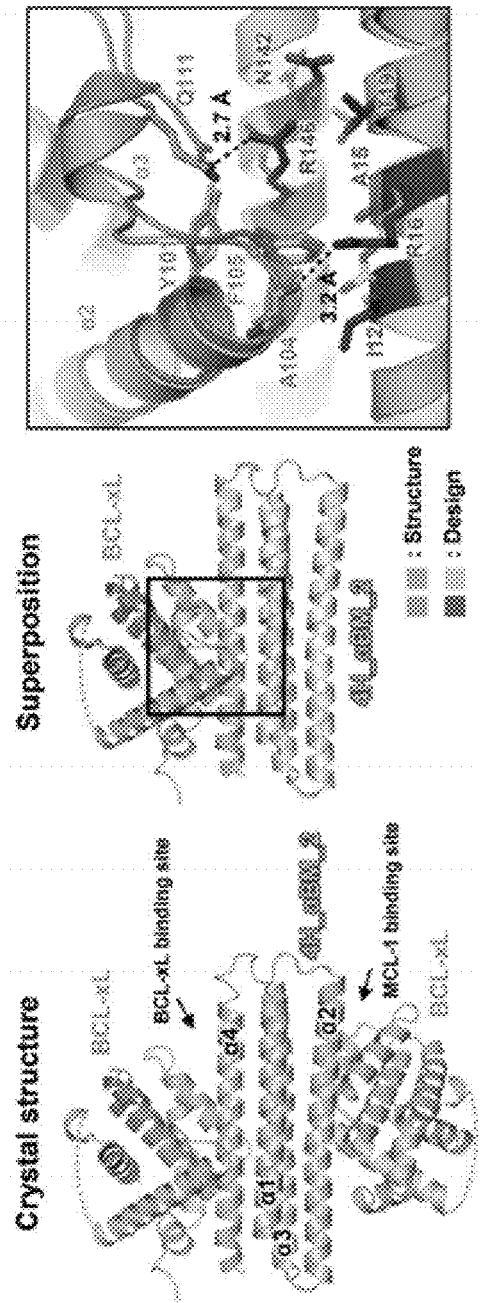
FIG. 3c shows the crystal structure of 4H_αBM_2-BCL-xL. BCL-xL binds to both the BCL-xL binding site and the MCL-1 binding site (left), and models designed in all regions containing BCL-xL helices α2 and α3 are closely superimposed with a Cα RMSD of 0.409 Å (center). The figure on the right shows the interaction of 4H_αBM_2 with helices α2 and α3 of BCL-xL.

Next, the crystal structure of 4H_αBM_2 in complex with BCL-xL was determined (Table 1). Even in the case of 4H_αBM_2 BCL-xL, the crystal structure indicated a 1:2 complex between 4H_αBM_2 and BCL-xL, closely matching the design model in all regions, including BCL-xL helices α2 and α3 with a Cα RMSD of 0.409 Å (FIG. 3c). The structure shows that the D12I, N16R, and T146R substitutions improved intermolecular interactions. Ile12 forms hydrophobic interactions with Ala104 and Phe105 of BCL-xL, while Arg16 forms electrostatic interactions with the backbone oxygen of Ala104 at the end of BCL-xL helix α2. Especially, Arg146 of 4H_αBM_2 contributes not only electrostatic interactions but also hydrophobic interactions with its aliphatic portion; its amino group makes a hydrogen bond with Gln111 of BCL-xL, and its b, c, and d carbon atoms are in close contact with Phe105 of BCL-xL (FIG. 3c).

Figure 3D:
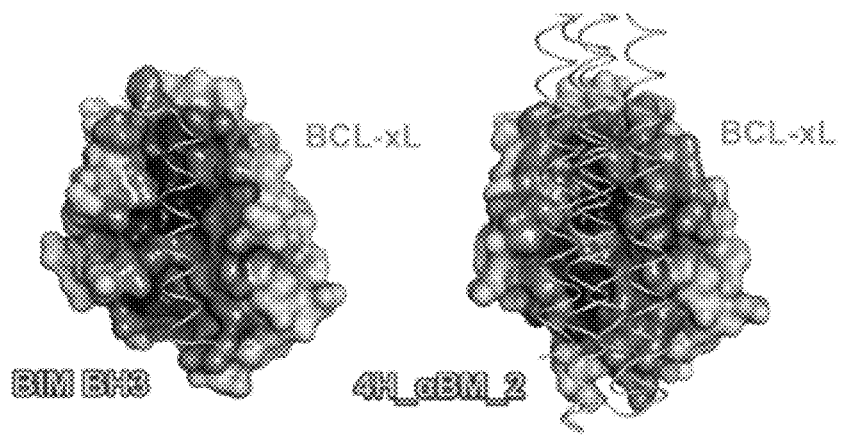
FIG. 3d shows an interface of BCL-xL with BIM BH3 or 4H_aBM_2.

In the crystal structure, 4H_αBM_2 buries 1511 Å$^2$ of the solvent-accessible surface of BCL-xL. This area significantly wider than the 1160 Å$^2$ of BCL-xL surface buried by the BH3 peptide in the template structure used for our design (PDB entry: 3FDL). This wider coverage seems to be due to the extra interactions provided by the first and third helices of 4H_αBM_2 as well as the main interaction between the BH3-like motif on the fourth helix and BCL-xL (FIG. 3d). These extra interactions may also explain why the binding affinity of 4H_αBM_2 for BCL-xL ($K_D$ of 0.21 nM) is much higher than the binding affinity of a 36-mer BIM BH3 peptide for BCL-xL ($K_D$ of 6.67 nM).

Figure 3E:
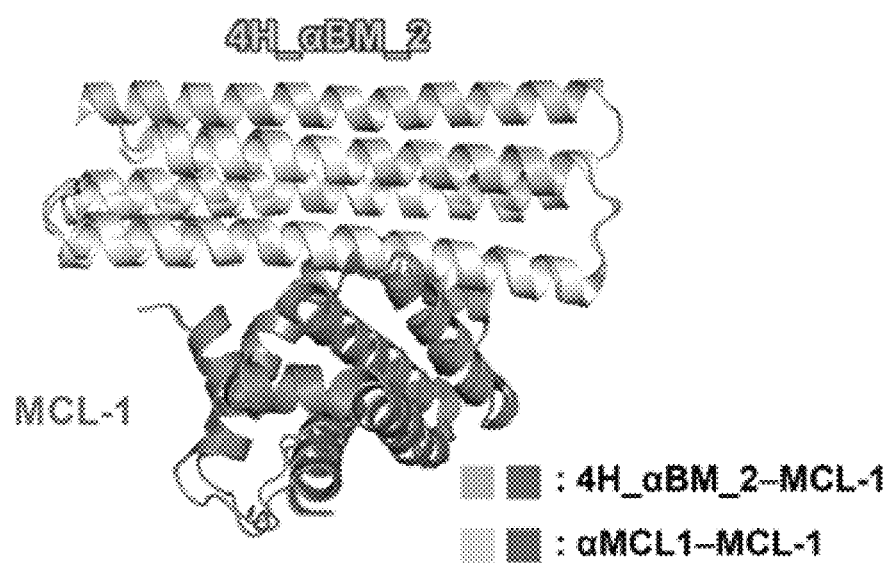
FIG. 3e shows the results of performing a structural alignment of 4H_αBM_2-MCL-1 and αMCL1-MCL-1.

The crystal structure for the 4H_αBM_2-MCL-1 was also determined (FIG. 3e, Table1). Unlike the 4H_αBM_2-BCL-xL complex, it revealed a 1:1 heterodimer between the two proteins. This indicates that the newly designed BCL-xL binding site has a lower affinity for MCL-1. When a structural alignment of 4H_αBM_2-MCL-1 and αMCL1-MCL-1 (PDB entry: 5JSB) was performed, it appeared that the Cα RMSD is 0.984 Å, and the designed model did not affect the three-helix bundle structure of αMCL1 (FIG. 3e).

<Example 4> the Affinity of the Designed Binding Site for Anti-Apoptotic BCL-2 Proteins—Design of 4H_αBM_3

Figure 3F:
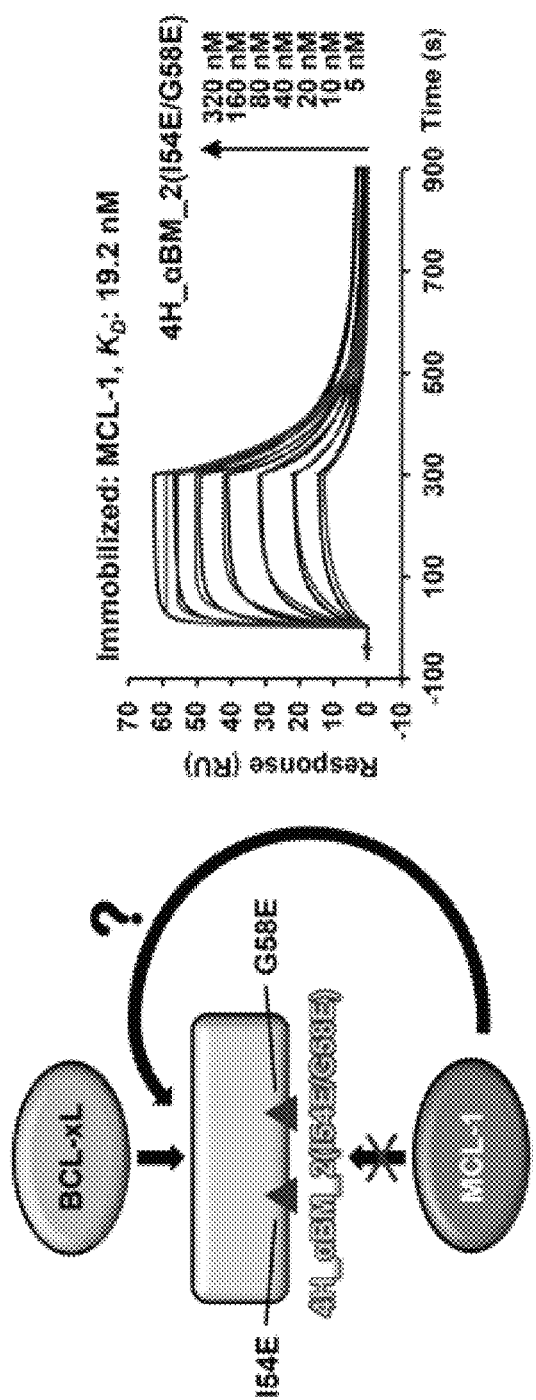
FIG. 3f shows the interaction of 4H_αBM_2 (I54E/G58E) with MCL-1. A schematic diagram of introducing I54E/G58E mutations into the 4H_αBM_2 and MCL-1 binding sites is shown (left). The binding affinity between 4H_αBM_2 (I54E/G58E) and MCL-1 is measured by SPR (right).

The MCL-1 binding site on the original αMCL1 is highly specific for MCL-1 with a $K_D$ of 0.15 nM, while its affinities for other anti-apoptotic BCL-2 proteins are much lower ($K_D$>10 μM). To evaluate the specificity of the newly designed binding site on 4H_αBM_2, we first introduced 154E and G58E mutations into the MCL-1 binding site on the second α-helix (FIG. 3f). Mutations of these conserved residues generally prevent binding to anti-apoptotic BCL-2 proteins. Thus, the resulting mutant protein, 4H_αBM_2

Figure 4A:
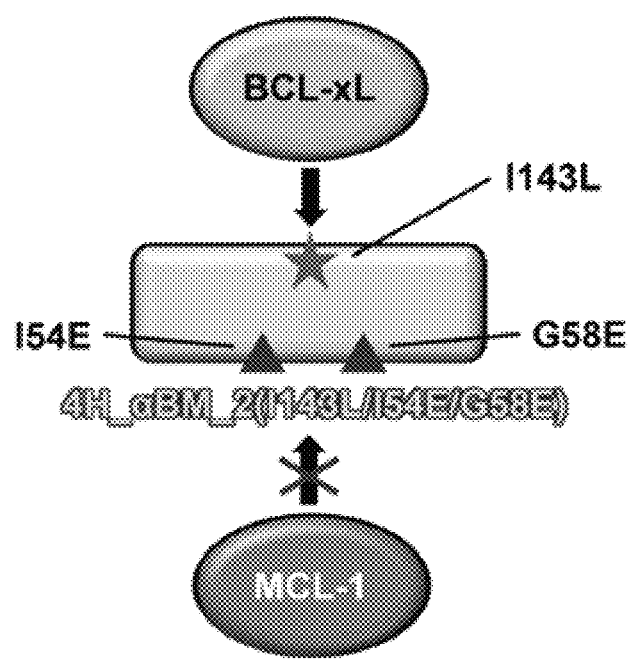
FIG. 4a shows a schematic diagram in which the I54E/G58E mutation is introduced into the MCL-1 binding site of 4H_αBM_2 and the I143L mutation is introduced into the BCL-xL binding site.
Figure 4B:
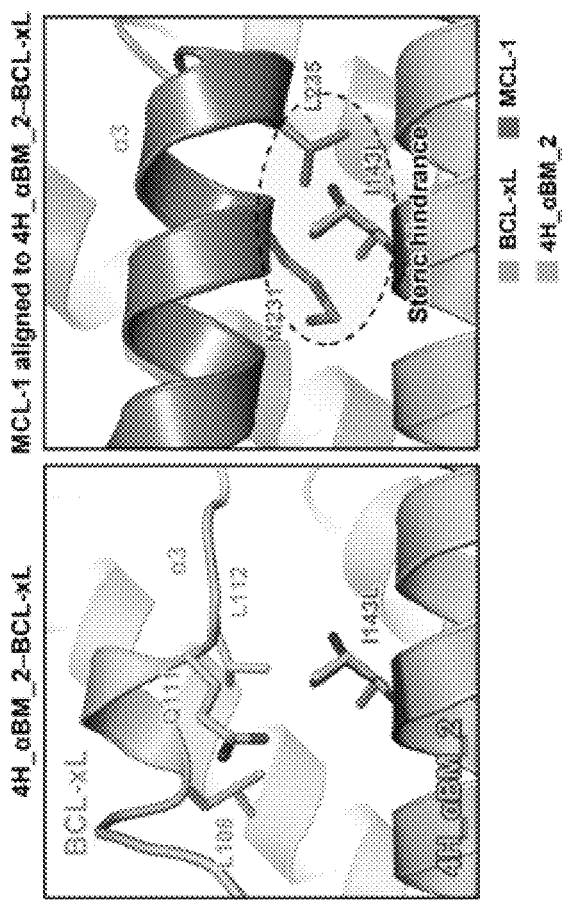
FIG. 4b shows that when the I143L mutation is introduced into the BCL-xL binding site, a steric hindrance can be introduced into MCL-1 without affecting BCL-xL binding.
Figure 4C:
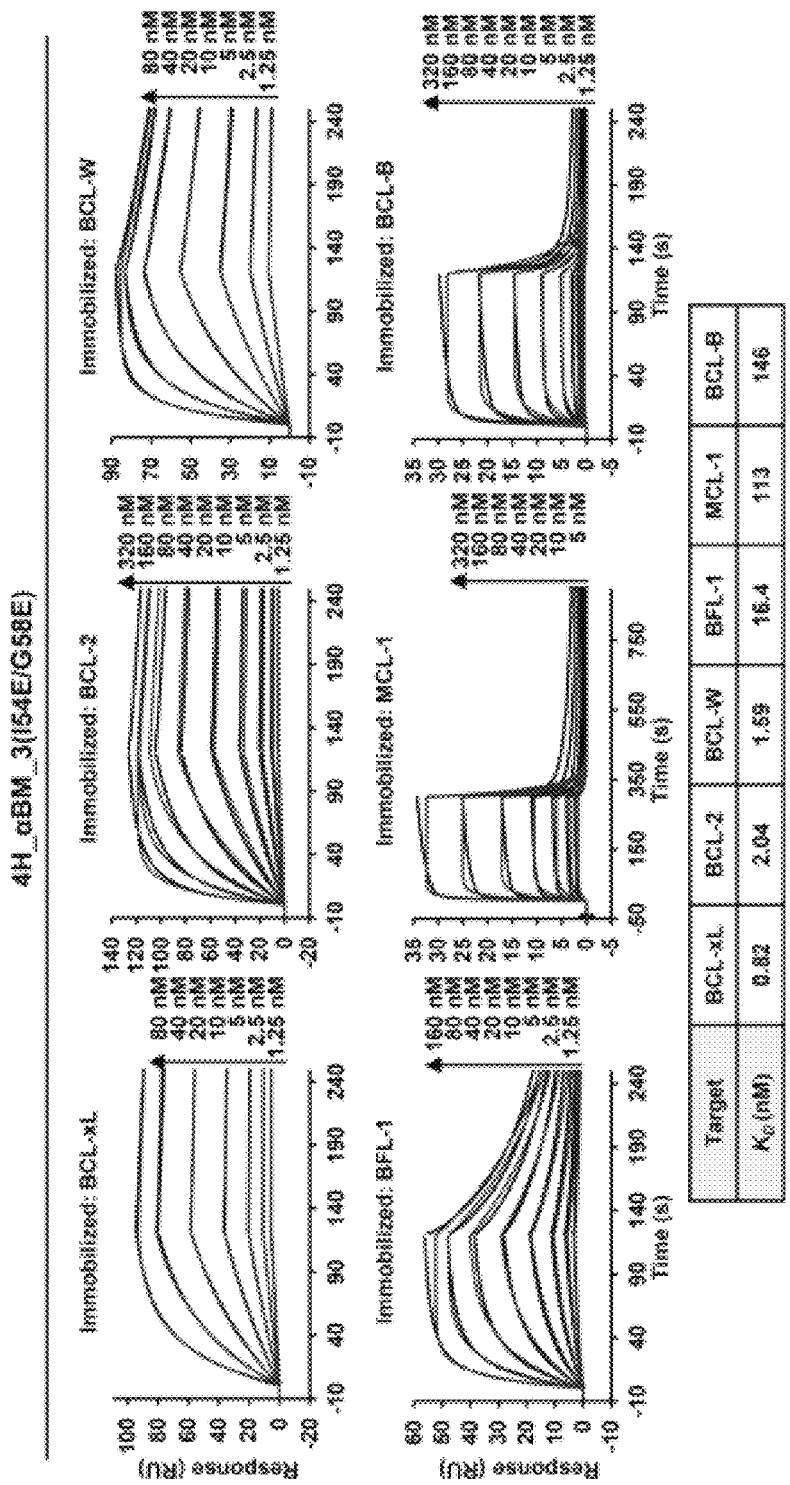
FIG. 4c shows the measurement of binding affinity to the anti-apoptotic BCL-2 family protein through SPR.
Figure 4D:
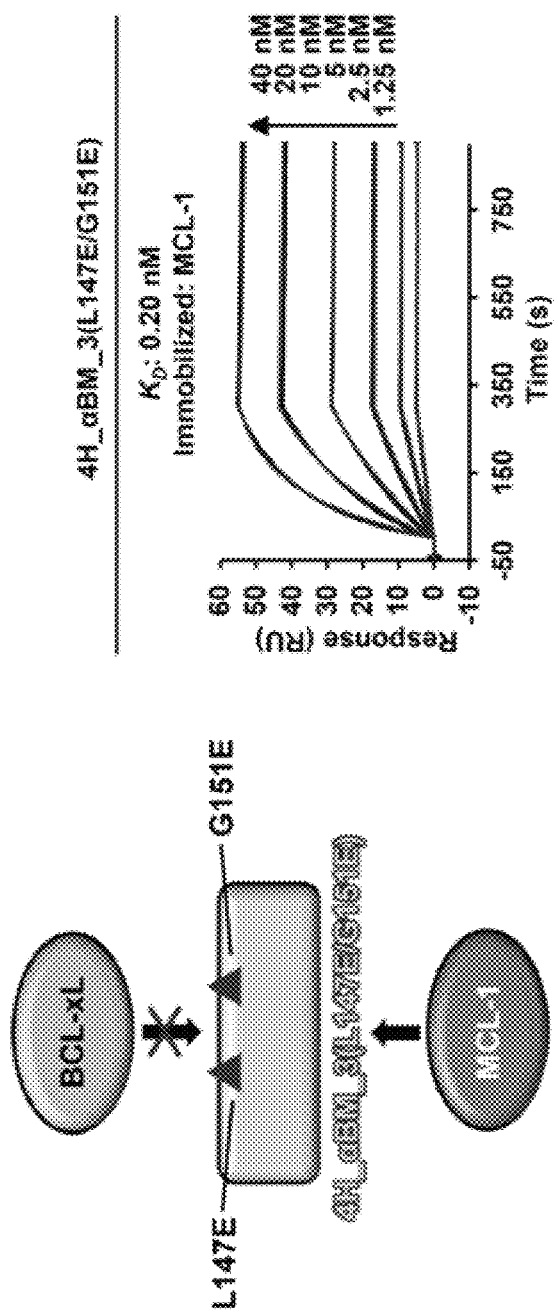
FIG. 4d shows the interaction between the MCL-1 binding site and MCL-2. In order to observe whether the original MCL-1 binding site retains the same potency, it shows a schematic diagram in which L147E and G151E mutations are introduced into 4H_αBM_3 (left). The binding affinity of 4H_αBM_3 (L147E/G151E) to MCL-1 is measured by SPR (right).

(I54E/G58E), should only be able to interact with anti-apoptotic BCL-2 proteins via the newly designed binding site on the fourth α-helix. Unlike the MCL-1 binding site, the newly designed binding site binds MCL-1 with fairly high affinity ($K_D$ of 19.2 nM) (FIG. 3f). To enhance this binding specificity, the structural superposition of MCL-1 on the 4H_αBM_2-BCL-xL complex was examined. As a result, it was confirmed that when the Ile143 hotspot residue was changed to leucine, it introduces steric hindrance with MCL-1 without affecting BCL-xL binding. Then, 4H_αBM_2 (I143L/I54E/G58E), containing this I143L mutation was produced, and its interactions with six different anti-apoptotic BCL-2 proteins (i.e., BCL-2, BCL-B, BCL-W, BCL-xL, BFL-1 (A1), and MCL-1) was measured (FIG. 4c). As a result, as expected, 4H_αBM_2 (I143L/I54E/G58E) exhibited ~7-fold reduced affinity for MCL-1 ($K_D$ of 133 nM) while maintaining picomolar affinity for BCL-xL (FIG. 4c). This variant showed fairly high affinity for BCL-2 ($K_D$ of 2.04 nM) and BCL-W ($K_D$ of 1.59 nM), reflecting the high sequence homology of the two proteins with BCL-xL. On the other hand, the variant exhibited much lower affinity for BCL-B ($K_D$ of 146 nM) and BFL-1 ($K_D$ of 16.4 nM). This specificity-enhanced design 4H_αBM_2 (I143L) was designated as "4H_αBM_3" (SEQ ID NO: 5). L147E and G151E mutations were introduced to 4H_αBM_3 to prevent MCL-1 from binding to the BCL-xL binding site, and it was observed whether the original MCL-1 binding site retains the same potency (FIG. 4d). This mutant, 4H_αBM_3 (L147E/G151E), tightly bound MCL-1 ($K_D$ of 196 pM), which is similar to the affinity of αMCL1 ($K_D$ of 150 pM) (FIG. 4d).

<Example 5> Evaluation of Pro-Apoptotic Activity of 4H_αBM_3

Cell viability experiments were performed to evaluated the apoptogenic activity of 4H_αBM_3. Lentivirus was used to express 4H_αBM_3 in K562, HCT-116, SW620, MEWO and A375 cancer cell lines. In addition to 4H_αBM_3, the 4H_αBM_3_BH3 and 4H_αBM_3_CTS constructs were generated, in which the BIM BH3 sequence (SEQ ID NO: 9) or the C-terminal sequence (CTS) (SEQ ID NO: 10) of BIM, respectively, are fused to the C-terminus of 4H_αBM_3. BIM BH3 directly activates BAX/BAK. The CTS of BIM is a mitochondria-targeting sequence that facilitates BIM's translocation to the mitochondrial outer membrane, the site of action for the anti-apoptotic BCL-2 proteins. Therefore, it was anticipated that these two constructs may enhance the apoptogenic efficacy of 4H_αBM_3.

Figure 5A:
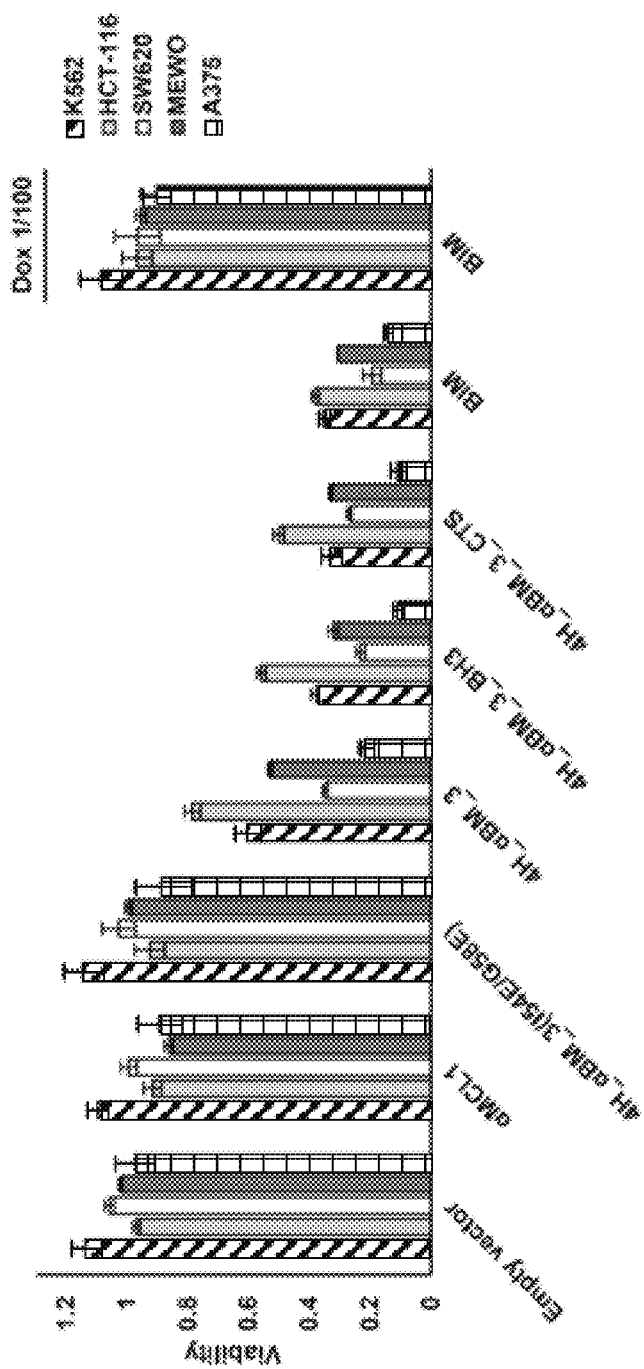
FIG. 5a shows the results of cell viability analysis of K562, HCT-116, SW620, MEWO and A375 cancer cell lines.

As a result of the experiment, the empty vector negative control did not induce cell death in any of the cell lines, nor expression of αMCL1 or 4H_αBM_3 (I54E/G58E), which target only MCL-1 or BCL-xL, respectively, did induce apoptosis. In contrast, expression of 4H_αBM_3 (targeting both BCL-xL and MCL-1) induced a clear reduction in cell viability (K562: 61%, HCT-116: 79%, SW620: 35%, MEWO: 53%, A375: 22%). Especially, 4H_αBM_3_BH3 and 4H_αBM_3_CTS reduced cell viability even further (for 4H_αBM_3_BH3, K562: 38%, HCT-116: 56%, SW620: 23%, MEWO: 32% and A375: 11%, for 4H_αBM_3_CTS, K562: 33%, HCT-116: 50%, SW620: 27%, MEWO: 33% and A375: 11%), confirming that the fused sequences enhance the apoptogenic activity of 4H_αBM_3 (FIG. 5a).

Figure 5B:
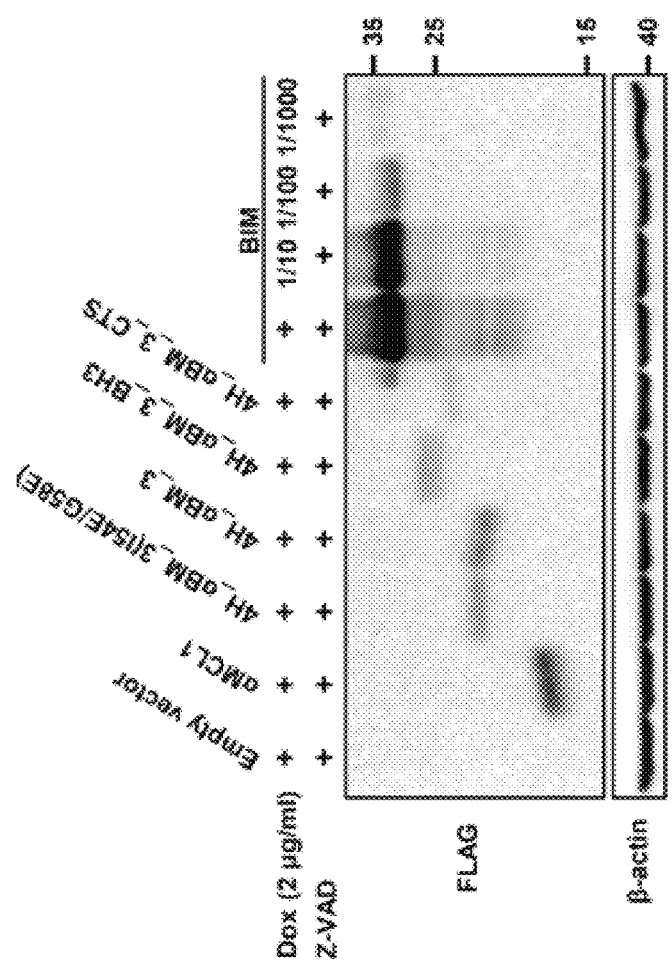
FIGS. 5b and 5c show the results of Western blot analysis to determine cytotoxicity.
Figure 5C:
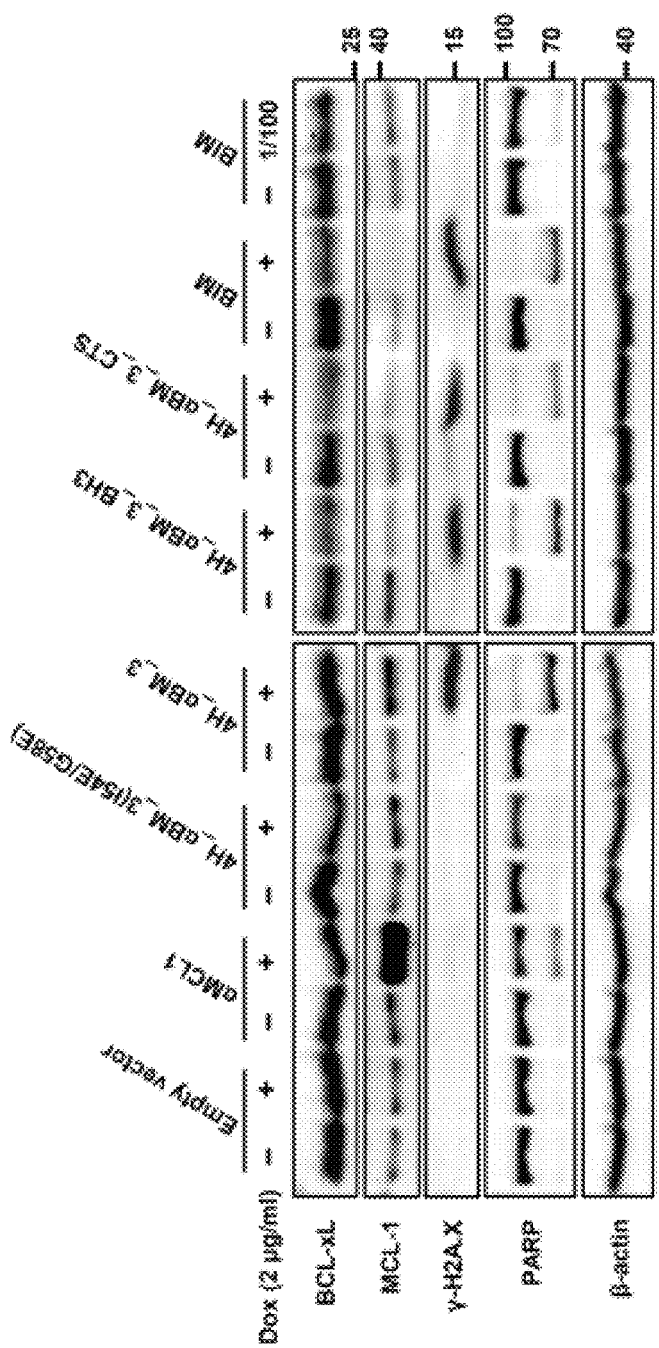

Experiments were performed to confirm whether the cytotoxic activities observed for these three proteins are stronger than that of full-length human BIM. Although BIM showed strong cytotoxicity, its initial expression level was so high that 100-fold lower doxycycline concentrations was used to induce similar levels of protein expression (FIG. 5a and FIG. 5b). After controlling for expression level, it was confirmed that 4H_αBM_3, 4 H_αBM_3-BH3, and 4H_αBM_3-CTS all exhibit stronger cytotoxicity than full-length human BIM (FIG. 5a and FIG. 5b). Presumably, this higher cytotoxicity reflects the >8-fold higher binding affinity of 4H_αBM_3 than human BIM BH3 for MCL-1 and BCL-xL. The cell death we observed was most likely caused by apoptosis, because we confirmed cleavage of the caspase substrate PARP and expression of the cell death marker γ-H2A.X (FIG. 5c).

Through the above experiment, it was found that 4H_αBM_3, 4 H_αBM_3_BH3 and 4H_αBM_3_CTS bind more strongly MCL-1 and BCL-xL than full-length human BIM to induce apoptosis.

Although the present invention has been described in detail with reference to the specific features, it will be apparent to those skilled in the art that this description is only for an embodiment and does not limit the scope of the present invention. Thus, the substantial scope of the present invention will be defined by the appended claims and equivalents thereof.

This application contains references to amino acid sequences and/or nucleic acid sequences which have been submitted concurrently herewith as the sequence listing text file entitled "000324usnp_SequenceListing.xml", file size 11 kilobytes (KB), created on 8 Nov. 2022. The aforementioned sequence listing is hereby incorporated by reference in its entirety pursuant to 37 C.F.R. § 1.52(e)(5).

What is claimed is:

1. A protein comprising any one amino acid sequence selected from the group consisting of the amino acid sequence of SEQ ID NO: 3, the amino acid sequence of SEQ ID NO: 4, and the amino acid sequence of SEQ ID NO: 5.

2. The protein according to claim 1, wherein a polypeptide containing an amino acid sequence that increases apoptogenic activity is fused to the protein comprising any one amino acid sequence selected from the group consisting of the amino acid sequence of SEQ ID NO: 3, the amino acid sequence of SEQ ID NO: 4, and the amino acid sequence of SEQ ID NO: 5.

3. The protein according to claim 2, wherein the polypeptide containing an amino acid sequence that increases apoptogenic activity is fused to the C-terminus of the protein comprising any one amino acid sequence selected from the group consisting of the amino acid sequence of SEQ ID NO: 3, the amino acid sequence of SEQ ID NO: 4, and the amino acid sequence of SEQ ID NO: 5, and the polypeptide containing an amino acid sequence that increases apoptogenic activity comprises the amino acid sequence of SEQ ID NO: 9 or the amino acid sequence of SEQ ID NO: 10.

4. A composition comprising the protein of claim 1.

* * * * *